US 7,094,358 B2

(12) United States Patent
Norling et al.

(10) Patent No.: US 7,094,358 B2
(45) Date of Patent: Aug. 22, 2006

(54) ULTRA-LOW SHRINKAGE COMPOSITE RESINS BASED ON BLENDED NEMATIC LIQUID CRYSTAL MONOMERS

(75) Inventors: Barry K. Norling, San Antonio, TX (US); Neera Satsangi, San Antonio, TX (US)

(73) Assignee: The University of Texas System, Austin, TX (US)

( * ) Notice: Subject to any disclaimer, the term of this patent is extended or adjusted under 35 U.S.C. 154(b) by 96 days.

(21) Appl. No.: 10/093,001

(22) Filed: Mar. 7, 2002

(65) Prior Publication Data

US 2003/0125435 A1 Jul. 3, 2003

Related U.S. Application Data

(60) Provisional application No. 60/273,998, filed on Mar. 7, 2001.

(51) Int. Cl.
  *C09K 19/52* (2006.01)
  *C09K 19/20* (2006.01)
  *C08K 5/12* (2006.01)
  *C08L 67/07* (2006.01)

(52) U.S. Cl. ............................ 252/299.01; 252/299.67; 524/294; 524/534; 524/559

(58) Field of Classification Search ............ 252/299.01, 252/299.67, 299.64; 264/16; 523/109, 115, 523/120, 105, 113; 524/294, 534, 559; 522/1; 359/99, 102
See application file for complete search history.

(56) References Cited

U.S. PATENT DOCUMENTS

| | | |
|---|---|---|
| 4,201,856 A | 5/1980 | Jackson, Jr. et al. |
| 4,215,033 A | 7/1980 | Bowen |
| 4,539,048 A | 9/1985 | Cohen |
| RE32,073 E | 1/1986 | Randklev |
| 4,588,756 A | 5/1986 | Bowen |
| 4,623,738 A | 11/1986 | Sugerman et al. |
| 4,659,751 A | 4/1987 | Bowen |
| 4,663,147 A | 5/1987 | DePrince |
| 4,753,652 A | 6/1988 | Langer et al. |
| 4,914,221 A | 4/1990 | Winkler et al. |
| 4,964,911 A | 10/1990 | Ibsen et al. |
| 4,978,640 A | 12/1990 | Kelly |
| 5,024,850 A * | 6/1991 | Broer et al. ............... 428/1.31 |
| 5,030,608 A | 7/1991 | Schubert et al. |
| 5,057,018 A | 10/1991 | Bowen |
| 5,064,877 A | 11/1991 | Nass et al. |
| 5,073,294 A | 12/1991 | Shannon et al. |
| 5,202,053 A | 4/1993 | Shannon |
| 5,276,068 A | 1/1994 | Waknine |
| 5,308,886 A | 5/1994 | Masuhara et al. |
| 5,328,947 A | 7/1994 | Taguchi et al. |
| 5,334,625 A | 8/1994 | Ibsen et al. |
| 5,372,796 A | 12/1994 | Wellinghoff |
| 5,401,528 A | 3/1995 | Schmidt |
| 5,472,797 A | 12/1995 | Yajima et al. |
| 5,486,548 A | 1/1996 | Podszun et al. |
| 5,502,087 A | 3/1996 | Tateosian et al. |
| 5,556,931 A | 9/1996 | Imura et al. |
| 5,563,230 A | 10/1996 | Hsu et al. |
| 5,622,648 A | 4/1997 | Parri et al. |
| 5,624,976 A | 4/1997 | Klee |
| 5,654,471 A | 8/1997 | Zahn et al. |
| 5,663,214 A | 9/1997 | Okada |
| 5,670,583 A | 9/1997 | Wellinghoff |
| 5,695,681 A | 12/1997 | Siemensmeyer et al. |
| 5,720,805 A | 2/1998 | Wellinghoff et al. |
| 5,730,601 A | 3/1998 | Bowman et al. |
| 5,804,097 A | 9/1998 | Delavier et al. |
| 5,808,108 A | 9/1998 | Chappelow et al. |
| 5,833,880 A | 11/1998 | Siemensmeyer et al. |
| 5,834,532 A | 11/1998 | Yamamoto et al. |
| 5,852,248 A | 12/1998 | Chadwick |
| 5,859,089 A | 1/1999 | Qian |

(Continued)

FOREIGN PATENT DOCUMENTS

| | | |
|---|---|---|
| CA | 2181507 | 1/1997 |
| DE | 10016524 A1 | 10/2001 |
| EP | 0159887 A2 | 10/1985 |
| EP | O 242 278 A2 | 4/1987 |
| EP | 0754 675 A2 | 1/1997 |
| EP | 0 869 112 A1 | 3/1998 |
| EP | 1142863 A2 | 10/2001 |
| GB | 2297549 | 8/1996 |
| GB | 2330139 A | 4/1999 |
| JP | H 5-178794 | 12/1991 |
| JP | 08-157597 | 6/1996 |
| WO | WO 79/01040 | 11/1979 |
| WO | WO 92/16183 | 1/1992 |
| WO | WO 93/22397 | 11/1993 |
| WO | WO 94/16129 | 7/1994 |
| WO | WO 94/24052 | 10/1994 |
| WO | WO 97/14674 | 4/1997 |
| WO | WO 98/13008 | 2/1998 |
| WO | WO 98/13008 | 4/1998 |
| WO | WO 98/23580 | 6/1998 |
| WO | WO 99/17716 | 4/1999 |
| WO | WO 02/070543 A2 | 9/2002 |

OTHER PUBLICATIONS

Schmidt, et al., New Liquid Crystalline di– and tetra–acrylates for Network Formation, Liquid Crystals, 2001, vol. 28, No. 11, 1611–1621.

(Continued)

*Primary Examiner*—Shean C. Wu
(74) *Attorney, Agent, or Firm*—Paula Morris; Morris & Amatong, P.C.

(57) ABSTRACT

Resin blends comprising liquid crystal monomers and secondary monomers useful to blend with liquid crystal monomers to maintain a nematic state under processing conditions while maintaining low cute shrinkage, particularly suitable for use in dental resin composites.

91 Claims, No Drawings

U.S. PATENT DOCUMENTS

| | | | |
|---|---|---|---|
| 5,865,623 A | 2/1999 | Suh | |
| 5,871,665 A | 2/1999 | Coates et al. | |
| 5,886,064 A | 3/1999 | Rheinberger et al. | |
| 5,897,885 A | 4/1999 | Petticrew | |
| 5,910,273 A | 6/1999 | Thiel et al. | |
| 5,911,911 A | 6/1999 | Keller et al. | |
| 5,955,514 A | 9/1999 | Huang et al. | |
| 5,989,461 A * | 11/1999 | Coates et al. | 252/585 |
| 5,998,499 A | 12/1999 | Klee et al. | |
| 6,022,404 A | 2/2000 | Ettlinger et al. | |
| 6,027,816 A | 2/2000 | Ono et al. | |
| 6,031,015 A | 2/2000 | Ritter et al. | |
| 6,060,042 A | 5/2000 | Schuhmacher et al. | |
| 6,087,816 A | 7/2000 | Volk | |
| 6,090,308 A | 7/2000 | Coates et al. | |
| 6,117,920 A * | 9/2000 | Jolliffe et al. | 522/170 |
| 6,136,225 A | 10/2000 | Meyer et al. | |
| 6,144,428 A * | 11/2000 | Schadt et al. | 349/113 |
| 6,194,481 B1 | 2/2001 | Furman | |
| 6,204,302 B1 | 3/2001 | Rawls et al. | |
| 6,217,792 B1 * | 4/2001 | Parri et al. | 252/299.61 |
| 6,217,955 B1 * | 4/2001 | Coates et al. | 428/1.31 |
| 6,258,974 B1 | 7/2001 | Wellinghoff et al. | |
| 6,291,035 B1 * | 9/2001 | Verrall et al. | 428/1.3 |
| 6,303,050 B1 | 10/2001 | Dannenhauer et al. | |
| 6,335,462 B1 | 1/2002 | Etzbach et al. | |
| 6,410,765 B1 | 6/2002 | Wellinghoff et al. | |
| 6,414,092 B1 * | 7/2002 | Coates et al. | 526/63 |
| 6,417,244 B1 | 7/2002 | Wellinghoff et al. | |
| 6,649,230 B1 * | 11/2003 | Seiberle et al. | 428/1.2 |
| 6,695,617 B1 | 2/2004 | Wellinghoff et al. | |
| 6,698,585 B1 | 3/2004 | Kammerer | |
| 6,699,405 B1 | 3/2004 | Prechtl et al. | |
| 2002/0013382 A1 | 1/2002 | Furman | |
| 2002/0036285 A1 | 3/2002 | Precht | |
| 2002/0177727 A1 | 11/2002 | Wellinghoff | |
| 2003/0036609 A1 | 2/2003 | Wellinghoff | |
| 2003/0055280 A1 | 3/2003 | Wellinghoff | |
| 2003/0125435 A1 | 7/2003 | Norling | |
| 2003/0168633 A1 | 9/2003 | Wellinghoff | |
| 2004/0144954 A1 | 7/2004 | Wellinghoff | |
| 2004/0199004 A1 | 10/2004 | Wellinghoff | |

OTHER PUBLICATIONS

Choi, Rheological studies on sterically stabilized model dispersions of uniform colloidal spheres. II. Steady–shear viscosity, J. Colloid Interface Science., Sep. 1986, pp. 101–113, vol. 113(1), Academic Press, Inc.

Condon, Reduction of composite contraction stress through non–bonded microfiller particles, Dental Materials, Jul. 1998, pp. 256–260, vol. 14.

Hikmet, Anisotropic polymerization shrinkage behavior of liquid–crystalline diacrylates, Polymer, 1992, pp. 89–95, vol. 33(1), Butterworth–Heinemann Ltd.

Furman et al, A Radiopaque Zirconia Microfiller for Translucent Composite Restoratives, Abstract, American Association for Dental Research meeting, 2000, Washington, D.C.

Liu, Constant–volume polymerization of composites by addition of ammonia–modified montmorillonite, American Journal of Dentistry, Apr. 1990, pp. 44–50, vol. 3(2).

Millich, Elements of light–cured epoxy based dental polymer systems, J. Dent. Res., Apr. 1998, pp. 603–608, vol. 77(4).

Rawls et al, Low Shrinkage resins from liquid crystal diacrylate monomers, ACS Polymer Preprints, Sep. 1997, pp. 167–168, vol. 38(2).

Stansbury et al, Cyclopolymerizable Monomers for use in dental resin composites, J. Dent. Res., Mar. 1990, pp. 844–848, vol. 69(3).

Uno et al, Marginal adaptation of a restorative resin polymerized at reduced rate, Scand. J. Dent. Res., 1991, pp. 440–444, vol. 99(5).

Holmberg, Ester Sysnthesis with Dicyclohexycarbodiimide Improved by Acid Catalysts, Acta Chemica Scandinavica, 1979, pp. 410–412, vol. B 33.

Nakamura, Characterization of Epitaxially Grown ZnS : Mn Films on a GaAs(100) Substrate prepared by the Hot–wall Epitaxy Technique, J. Mater. Chem., 1991, pp. 357–359, vol. 1(3).

Schultz, Polymerization and Viscoelastic Behavior of Networks from a Dual–Curing, Liquid Crystalline Monomer, J. Polym. Phys., 1999, pp. 1183–1190, vol. 37, John Wiley & Sons, Inc.

Griffin, Mesogenic Polymers. III. Thermal Properties and Synthesis of Three Homologous Series of Thermotropic Liquid Crystalline "Backbone" Polyesters, Journal of Polymer Science: Polymer Physics Edition, 1981, pp. 951–969, vol. 19, John Wiley & Sons, Inc.

Hutchins, Aqueous Polar Aprotic Solvents. Efficient Sources of Nucleophilic Oxygen, J. Org. Chem. 1983, pp. 1360–1362, vol. 48, The American Chemical Society.

Kornblum, Displacement of the Nitro Group of Substituted Nitrobenzenes—a Synthetically Useful Process, J. Org. Chem., 1976, pp. 1560–1564, vol. 41, The American Chemical Society.

Clark, X–Ray Scattering Study of Smectic Ordering in a Silica Aerogel, Physical Review Letters, Nov. 22, 1993, pp. 3505–3508, vol. 71, No. 21, The American Chemical Society.

Broer, In–Situ photopolymerization of oriented liquid–crystalline acrylates, 4 influence of a lateral methyl substituent on monomer and oriented polymer network properties of a mesogenic diacrylate, Makromol. Chem. 1989, pp. 3201–3215, vol. 190, Huthig & Wepf Verlag Basel, Heidelberg, New York.

Barclay, Liquid Crystalline and Rigid–rod Networks, Prog. Polym. Sci., 1993, pp. 899–945, vol. 18(5), Pergamon Press Ltd.

Liquid Crystalline Polymers to Mining Applications, Encyclopedia of Polymer Science and Engineering, 1987, pp. 1–61, vol. 9, John Wiley & Sons, New York.

Norling et al, Synthesis of a new low shrinkage liquid crystal monomer, Abstract, American Association for Dental Research meeting, 2000, Washington, D.C.

Meek, Inertness of Tetrachlorofulvenes in the Diels–Alder Reaction, J. Org. Chem., Jan. 9, 1958, pp. 1708–1710, vol. 22 (12), The American Chemical Society.

Suzuki et al, Preparation of poly(dimethylsiloxane) macromonomers by the initiator method': 2. Polymerization mechanism, Polymer, 1989, pp. 333–337, vol. 30(2), Butterworth & Co. (Publishers) Ltd.

Kochan et al, Solid Freeform Manufacturing—Assessments and Improvements at the Entire Process Chain, Proceedings of the Seventh International Conference on Rapid Prototyping, Mar. 31–Apr. 3, 1997, pp. 203–214, 94RA021.

Norling et al, Cure shrinkage of experimental LC monomer based composite resins, Abstract, American Association for Dental Research meeting, 2001, Chicago, IL.

Mogri et al, Thermomechanical of liquid crystalline monomer in dental composites, Abstract, American Association for Dental Research meeting, 2001, Chicago, IL.

Dowell et al, The Effect of Silanation on Polymerization and Dynamic Mechanical Behavior of a homogeneous nanofilled resin, Abstract, American Association for Dental Research meeting, 2001, Chicago, IL.

Logan et al, Effect of Silanation on Mechanical Properties of Homogeneous Nanofilled resins, Abstract, American Association for Dental Research meeting, 2001, Chicago, IL.

Norling et al, Cure Shrinkage of composite resins and an experimental LC monomer, J. Dent. Res., 1999, pp. 233 (Abstract 1020), vol. 78.

Boland et al, Cell Survival and Cytokine Expression by Dental Cells Treated with a Liquid Crystal Resin Monomer, J. Dent. Res., 2001, pp. 151 (Abstract 928), vol. 80.

Wellinghoff et al, Reduced Shrinkage dimethacrylate liquid crystal resins, J. Den. Res. 1997, pp. 279 (Abstract 2127), vol. 76.

Norling et al, Polymerizable nematic liquid crystal monomers for reduced shrinkage restorative resins, Proc. 17th Southern Biomed. Eng. Conf., 1998, p. 120.

Hellwig et al, Effect of the Layer Technique on the Polymerization of Two Light–Activated Composite Filling Materials, Dtsch. Zahnaerztl Z., 1991, pp. 270–273, vol. 46.

Bigg, et al.; "The Effect of Monomer Structure on the Adhesive Properties of Thermally Reversible Isocyanate Polymers"; ANTEC 2000: Conference Proceedings vol. 1—Processing; May 7, 2000–May 11, 2000; pp. 1228–1231; 58th, vol. 1; Society of Plastics Engineers, USA.

Wang, et al.; "Synthesis and Properties of Phosphorous Containing Polyester–Amides Derived from 1,4–Bis(3–aminobenzoyloxy)–2–(6–oxido–6H–dibenz<c, e><1,2>oxaphosphorin–6–yl) Phenylene"; Journal of Polymer Science: Part A: Polymer Chemistry; (1999); pp. 891–899; vol. 37; John Wiley & Sons, Inc., USA.

Kim, et al.; "Effects of Annealing on the Structure Formation in the Bulk State of Thermotropic Liquid Crystalline Polyesteramides with Bulky Side Groups": Eur. Polym. J.; (1995) pp. 505–512; vol. 31, No. 6; Elsevier Science Ltd., UK.

Aharoni; "Dilute and Concentrated Solution Properties of Zigzag Polymers Comprising Long Rodlike Segments with Freely Rotating Joints"; Macromolecules; (1987); pp. 877–884; vol. 20, No. 4; American Chemical Society, USA.

Wan, et al.; "Relationship Between Chemical Structure and Properties for Mesogen–Jacketed Liquid Crystal Polymers"; Gaodeng Xuexiao Huaxue Xuebao; (1998); pp. 1507–1512; vol. 19, No. 9; Gaodeng Jiaoyu Chubanshe, CN; Abstract Only.

H. Schmidt et al., "Organically modified ceramics and their applications", Journal of Non–Crystalline Solids, 1990, 121, pp. 428–435.

Mark W. Ellsworth et al., "Mutually Interpenetrating Inorganic–Organc Networks. New Routes into Nonshrinking Sol–Gel Composite Materials", J. Am Chem. Soc., 1991, 113, 2756–2758.

Stephen Wellinghoff et al., "Tantalum oxide–polymer composites", The International Symposium on Advances in So.–Gel Process and Applications, Edited by Y.A. Attia, Plenum Press, pp. 141–154, 1994.

Christine Landry et al., "In situ polymerization fo tetraethoxysilane in poly(methyl) methacrylate): morphology and dynamic mechanical properties", POLYMER, 1992, vol. 33, No. 7, pp. 1486–1495.

Wolfgang, Wedler et al., "Vitrification in Low–molecular–weight mesogenic Compounds", J. Mater. Chem., 1991, 1(3), 347–356.

Sukmin Lee et al., "Phase Behavior of Liquid Crystalline Polymer/Model Compound Mixtures: Theory and Equipment", Macromolecules, vol. 27, No. 14, 1994, 3955–3962.

R.A.M. Hikmet et al., "Effect of the Orientation of the Ester Bonds on the Properties of Three Isomeric Liquid Crystal Diacrylates Before and After Polymerization", Macromolecules, vol. 28, No. 9, 1995, 3313–3327.

Y. Wei et al., "Synthesis of New Organic–Inorganic Hybrid Glasses"; Chem. Mater. 2(4), 337 (1990).

Manabu Node et al. "Hard Acid and Soft Nucleophile System. 2, [1]. Demethylation of Methyl Ethers of Alcohol and Phenol with an Aluminum Halide–Thiol System", J. Org. Chem. 1980, 45, 4275–4277 (1980 American Chemical Society).

Glancarto Galli et al., "Thermotropic poly(ester –β–sulfide)s", Polymer Bulletin 21, 563–569 (1989).

* cited by examiner

ULTRA-LOW SHRINKAGE COMPOSITE RESINS BASED ON BLENDED NEMATIC LIQUID CRYSTAL MONOMERS

The present application claims the benefit of the filing date of U.S. Provisional Application Ser. No. 60/273,998 filed on Mar. 7, 2001.

The U.S. Government has a paid-up license in this invention and the right in limited circumstances to require the patent owner to license others on reasonable terms, as provided for by the terms of NIDCR 1 P01 DE 11688.

BACKGROUND OF THE INVENTION

The popularity of dental resin composites as the anterior restorative material of choice has continued to grow over recent decades. Resin composites also are widely used in posterior applications, particularly in small, lightly loaded restorations.

Dental resin composites have not been universally accepted for use in large posterior restorations for a number of reasons, one being cure shrinkage. Volumetric shrinkage—defined as shrinkage of a curing resin after gelation has occurred—can generate interfacial stresses at the resin-tooth junction. These interfacial stresses can debond the dentin-restorative interface or fracture the tooth or restorative, which can cause marginal leakage, microbial attack, and long term catastrophic failure of the bulk restoration.

The remarkable advances in dentinal bonding over the past two decades have not led to consistent amalgam-like sealing of resin composite restoration margins. Instead, the gap has simply moved from the restoration interface to an adjacent area, totally within the tooth or totally within the restoration. Even if the interface remained intact, shrinkage induced internal stresses may contribute to long-term stress crack formation and even long-term failure.

Liquid crystal monomers have promise for reducing cure shrinkage and consequent stresses in dental composites. Of greatest interest are the bifunctional terminated, nematic liquid crystal monomers of the type $Cn(R2,R1,R3)$ shown below:

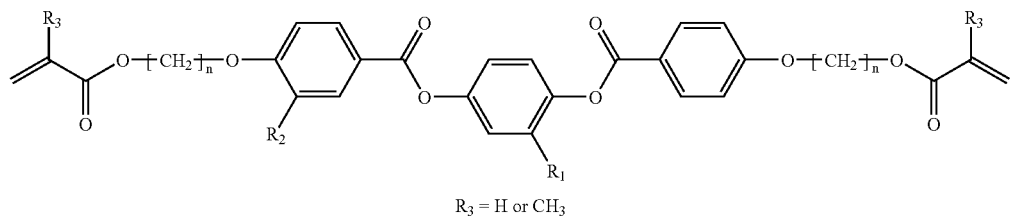

$R_3 = H$ or $CH_3$

Unfortunately, the routes used to date to synthesize these LC monomers are complicated, and produce very low yields.

Also, the liquid crystal monomer should maintain a liquid crystalline state during processing in order to be useful in forming dental composites. For comfort in dental applications, the resin should be curable at ambient temperature up to body temperature, or from about 20° C. to about 37° C. Unfortunately, a resin containing only a single bisacrylate terminated, nematic liquid crystal monomer has been found to rapidly crystallize upon addition of filler. It may be possible to alleviate the problem of premature crystallization by blending of monomers; however, certain blends exhibit much higher polymerization shrinkage than others.

Liquid crystal monomers also present a problem because cure shrinkage is temperature dependent, and increases rapidly as the N→I transition temperature is approached. If the N→I transition temperature of the LC monomer resin is just slightly above mouth temperature, then excessive polymerization shrinkage may result.

Economic methods are needed for making liquid crystal monomers on a commercial scale, and for producing blends of liquid crystal monomers that both remain in a nematic state under processing conditions and exhibit extremely low cure shrinkage.

SUMMARY OF THE INVENTION

A method comprising:
providing a 4-hydroxyl benzoic acid comprising a carboxyl substituent;
providing an alkylene group comprising an α-hydroxyl group and an ω-halide group;
condensing said 4-hydroxyl of said benzoic acid with said ω-halide group under conditions effective to produce a hydroxyl terminated alkyloxy comprising said α-hydroxyl group at a first terminus and said carboxyl substituent of said 4-hydroxyl benzoic acid at a second terminus.

DETAILED DESCRIPTION OF THE INVENTION

A relatively simple method of making LC monomers is provided, along with novel monomer blends and novel secondary monomers for use in such blends. The blends remain in a nematic state even after the addition of inorganic filler. The blends also exhibit low cure shrinkage. The method is useful to synthesize liquid crystal (LC) monomers with N→I temperatures of about 50° C. or more. LC monomers also are blended with related monomers, such as bridged monomers or assymetric monomers, to produce liquid crystalline blends with nematic stability at from about 20° C. to about 50° C. The blends resist crystallization for prolonged periods of time, even in the presence of inorganic fillers, while remaining liquid crystalline and exhibiting as low a volumetric shrinkage as possible upon curing. Preferably, the blends remain in the liquid crystalline state for about 10 minutes or more; preferably 30 minutes or more, more preferably about 1 hour or more; even more preferably about 4 hours or more; and, most preferably about 1 month or more. As a practical matter, for dental filling purposes, the filler would be added during manufacture and a shelf life of 6 months or more would be required for commercial acceptability.

Suitable volumetric shrinkages are about 4 vol. % or less, preferably 2 vol. % or less, more preferably 1.5 vol. % or less.

Liquid crystal monomers have promise for reducing cure shrinkage and consequent stresses in dental composites for several reasons, including but not necessarily limited to improved rheology and "virtual expansion." Oligomeric nematics have considerably lower viscosities than isotropic molecules of the same molecular weight because of co-operative reorientation of the molecules under shear. Low viscosity also exists even at high colloidal particle fractions. Conversely, for the same viscosity, a nematic liquid crystal monomer can have a substantially higher molecular weight. This "double bond dilution" results in proportionate reductions in polymerization shrinkage. If the structure transforms from nematic to isotropic during polymerization, a further reduction in shrinkage occurs because the more closely packed ordered structure characteristic of the nematic state is lost.

Of greatest interest are the bifunctional terminated, nematic liquid crystal monomers, discussed above. Suitable bifunctional terminated, nematic liquid crystals have the following general structure:

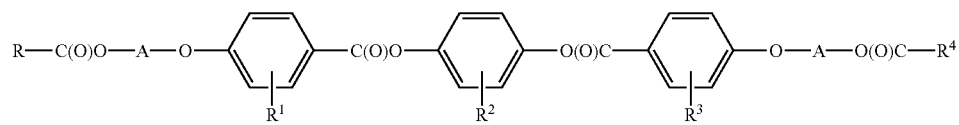

wherein:
$R^2$ is a "bulky organic group," defined herein as an organic group having a bulk greater than $R_1$ and $R_3$, said bulk being adapted to provide sufficient steric hindrance to achieve a nematic state at room temperature while suppressing crystallization of the liquid crystal monomers at 20° C. The result is effective rheology and workability at room temperature. Suitable $R^2$ groups generate asymmetry in the packing of the molecules, and include, but are not necessarily limited to t-butyl groups, phenyl groups, isopropyl groups, and secondary butyl groups. Most preferred $R^2$ groups are t-butyl groups; and
$R^1$ and $R^3$ are selected from groups less bulky than $R^2$, preferably selected from the group consisting of hydrogen atoms and methyl groups, preferably hydrogen atoms;

A is selected from the group consisting of branched and linear alkyl groups having from about 2 to about 12 carbon atoms, preferably having from about 2 to about 9 carbon atoms, more preferably having from about 2 to about 6 carbon atoms, and most preferably having about 6 carbon atoms, wherein said branched alkyl groups comprise branches having from about 1 to about 4 carbon atoms; and
R and $R^4$ are polymerizable groups, including but not necessarily limited to nucleophiles and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Preferred electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms.

In a preferred embodiment, $R^1$ and $R^3$ are hydrogen, $R^2$ is a t-butyl group, A is a hexyl group, and R and $R^4$ are selected from the group consisting of an acryl group and a methacryl group.

The bisacrylate-terminated liquid crystals can be photopolymerized within seconds with very low polymerization shrinkage to densely crosslinked networks of reaction extent >95% by the usual free radical mechanisms, provided that the polymerization takes place at a high enough temperature. The projected polymerization shrinkage decreases with lowered polymerization temperature. In fact, the extrapolated room temperature shrinkage of the C6(H,H,H) monomer is approximately 0%.

Preliminary work demonstrated that LC monomers could be synthesized which were nematic over the room to mouth temperature range. Specifically, two monomers (of the many new monomers synthesized) were shown to exhibit these properties. These monomers were 1,4-bis(4-(6-acryloyl-1-hexyloxy)benzoyloxy)2-t-butylbenzene (the "diacrylate monomer," sometimes called C6-t-butyl-diacrylate, e.g., or simply C6BA). and 1,4-bis(4-(6-methacryloyl-1-hexyloxy) benzoyloxy)2-t-butylbenzene (the "dimethacrylate monomer," sometimes called C6-t-butyl-dimethacrylate, e.g., or simply C6BMA). The diacrylate monomer has the following general structure, with n being from about 2 to about 12, preferably from about 2 to about 10, more preferably from about 2 to about 6, and most preferably 6:

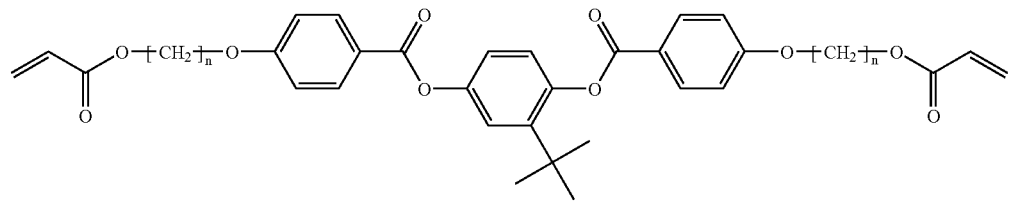

The mesophase transformation temperatures for certain of these monomers are shown in the following table.

| n | Crystalline m.p., ° C. | S→C*, ° C. | N→S**, ° C. | I→N***, ° C. |
|---|---|---|---|---|
| 6 | 67 | — | 15 | 45 |
| 10 | 72 | 17 | 22 | 43 |

*smectic to crystalline transition temperature
**nematic to smectic transition temperature
***isotropic to nematic transition temperature These monomers are metastable nematic at ambient temperatures.

It is true that resins containing a single LC monomer have many advantages. Single LC monomers are metastable. For example, the "diacrylate monomer" with n=6 has a nematic (meta)stability range of 15 to 45° C., and a crystalline melting point of 67° C. After melting and cooling to ambient temperature, a sample of the diacrylate monomer has remained in the nematic liquid crystal state for about 5 years. Liquid crystal (LC) monomers also exhibit much less shrinkage when compared with a conventional reference system, bis-GMA-TEGDMA-Bis-EMA (GTE) (as little as 1.6 percent vs. 8.2 percent, respectively, at similar degrees of conversion). However, it has been discovered that single monomer systems also have the disadvantage of rapidly crystallizing upon addition of filler.

Novel Method of Synthesis of LC Monomers

The invention provides a novel method for synthesizing a variety of LC monomers, including the bifunctional terminated, nematic monomers discussed above. The following is an illustration of the method, generally:

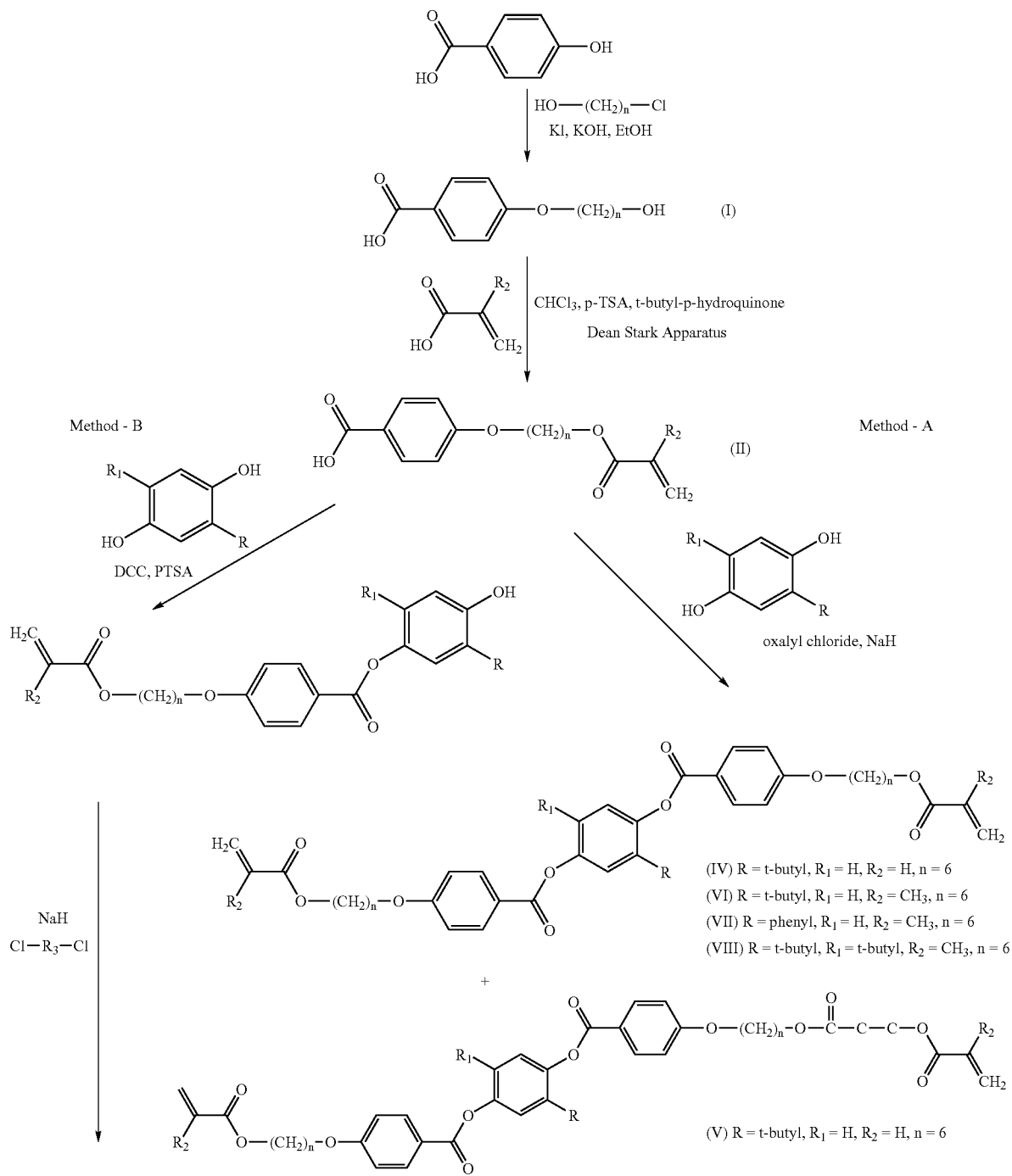

-continued

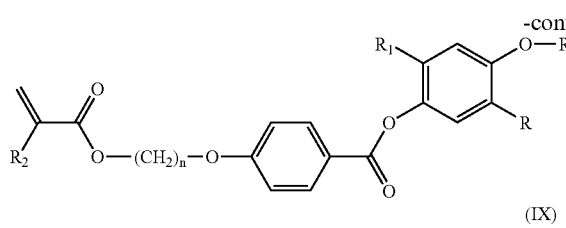 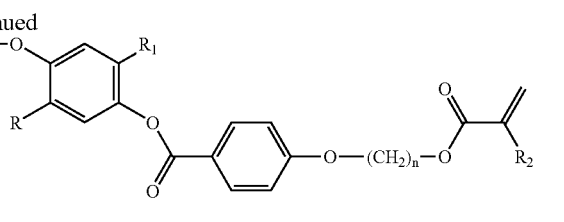

(IX)

R = t-butyl, H or phenyl
$R_1$ = t-butyl, H
$R_2$ = H, $CH_3$
$R_3$ = (a) $(CH_2)_n$
(b) —CO—$(CH_2)$—CO—
(3) —CO-bz-O—$(CH_2)_n$—O-bz-CO—

The method involves condensing the 4-hydroxyl group of 4-hydroxyl benzoic acid with the ω-halide group (preferably, an ω-chloride) of an α-hydroxy, ω-halo alkane comprising from about 2 to about 12 carbon atoms, producing a corresponding hydroxyl terminated alkyloxy comprising said α-hydroxyl group at a first terminus and said carboxyl substituent of said 4-hydroxyl benzoic acid at a second terminus. The alkane group preferably comprises from about 2 to about 10 carbon atoms, more preferably from about 2 to about 6 carbon atoms, and most preferably 6 carbon atoms. The product yield preferably is about 90% or more.

The 4-ω-hydroxyalkyloxy benzoic acid is useful as an intermediate for further syntheses. Preferably, the carboxyl substituent of the 4-ω-hydroxyalkyl benzoic acid is activated to its acid halide, preferably to its acid chloride using an acid chlorinating agent, such as thionyl chloride, sulfuryl chloride, oxalyl chloride etc., preferably neat oxalyl chloride. The ω-hydroxy group is reacted with a polymerizable group under conditions effective to produce an ethereal benzoic acid comprising said polymerizable group at said first terminus and said activated carboxyl group at said second terminus, in α- and ω-positions. The carboxyl substituent is then reacted with an ionically activated hydroxyl group of a hydroquinone comprising a bulky organic group under conditions effective to produce a compound comprising at least two aromatic rings joined by an ester linkage and comprising a polymerizable group as a first terminus and either a second polymerizable group or the second hydroxyl group of the hydroquinone as a second terminus.

The bulky organic group of the hydroquinone is adapted to generate asymmetry in packing of the LC monomer and to provide sufficient steric hindrance for the LC monomer to achieve a nematic state at processing conditions while suppressing crystallization of the LC monomer at processing conditions. Processing conditions comprise a temperature of from about 20° C. to about 40° C., preferably from about 20° C. to about 37° C. Suitable bulky organic groups include, but are not necessarily limited to t-butyl groups, phenyl groups, isopropyl groups, and secondary butyl groups. In a preferred embodiment, the bulky organic group is a t-butyl group.

The polymerizable group is selected from the group consisting of a nucleophile and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Preferred groups comprising electron deficient alkenes independently are selected from the group consisting of substituted and unsubstituted organic acids comprising a polymerizable unsaturated carbon-carbon bond and comprising from about 2 to about 12 carbon atoms. Most preferred electron deficient alkenes are selected from the group consisting of acrylic acid, and methacrylic acid.

In a preferred embodiment, both the first and second hydroxyl groups of said hydroquinone are each reacted with a carboxyl substituent of separate ethereal benzoic acid molecules under conditions effective to produce a nematic liquid crystal comprising three aromatic rings joined by an ester linkage and comprising at least a first polymerizable terminus, preferably both an α and an ω polymerizable termini.

While investigating the problems associated with the di-esterification of 2-t-butyl-1,4-hydroquinone with p-(ω-acrylyloxyhexyloxy)-benzoic acid to produce the MLAP byproduct, the reaction repeatedly produced p-(ω-acryloxy hexyloxy)-benzoic, 2-t-butyl-1,4-hydroquinone monoester. The most reasonable cause for this monoesterification was the presence of the very bulky tertiary butyl group adjacent to the 'OH' group on 2-t-butyl hydroquinone monoester derivative. The second esterification reaction was sterically not favored even if a very efficient coupling agent, dicyclohexylcarbodiimide (DCC), was used with the aid of para-toluene sulfonic acid (PTSA) as catalyst and even at elevated temperatures.

Without limiting the invention to a particular mechanism, the formation of MLAP as a by-product using acrylic acid is believed to take place via "Michael-type Addition" of a free acrylate group on the double bond of the one propenoyl terminus of 1,4-bis(4-(ω-acryloyloxy-1-A-oxy)benzoyloxy) 2-t-butylbenzene. The presence of an electron donor group next to the 'carbonyl' carbon might reinforce the electron density on the terminal methylene carbon of the aforesaid propenoyl terminus, and therefore, might discourage the nucleophilic attack by free acrylate anion in the aforesaid Michael-type Addition. As a result, the formation of by-product could be inhibited, leaving behind only 1,4-bis (4-(ω-methacryloyloxy-1-alkyloxy)benzoyloxy)2-t-butylbenzene as the major product in a clean and a non-labor intensive reaction. The commercial viability of the synthesis would therefore be increased.

It was, therefore, determined that both 'the carboxyl group' of p-(ω-acryloxyhexyloxy)benzoic acid and the hydroxyl group of the 2-t-butyl-hydroquinone had to be activated in order to perform a forced coupling between the two. Hence, p-(ω-acryloxy hexyloxy)-benzoic acid is activated to its chloride and the 2-t-butyl-hydroquinone is activated to its highly active disodium salt. The coupling between both activated species yields the symmetrical diester of 2-t-butyl-1,4-hydroquinone as a major product.

Where methacrylic acid is used as the "polymerizable group," the method produces a methacryloyl group as a terminus, and the product yield is about 80% or more of 1,4-bis(4-(ω-methacryloyloxy-1-alkyloxy)benzoyloxy)2-t-butylbenzene. Where the polymerizable group is acrylic acid, the method produces an acryloyl group as a terminus, and the product yield is about 60% of 1,4-bis(4-(ω-acryloyloxy-1-alkyloxy)benzoyloxy)2-t-butylbenzene and about 40% of a byproduct having as one terminus an oligomeric ester, namely 2-(t-butyl), 1-[4-(6-acryloxy-alkyl-1-oxy)-benzoyloxy], 4-{4-[6-(3-acryl oxy-propionoxy)-alkyl-1-oxy]-benzoyloxy}-benzene.

The method promises versatility for making mono- or even bifunctional terminated, nematic LC monomers at relatively low cost in respectable yields. The method has relatively few reaction steps and does not require purification of intermediates. In addition, the final product may be purified through recrystallization.

The method has been used to synthesize relatively large quantities of the 60/40 diacryl-MLAP product. Single batches of about 100 g of the 60/40 diacryl-MLAP product have been achieved, and the synthesis appears promising for scale up of the manufacture of blends of monomers in commercial quantities.

The invention will be better understood with reference to the following examples, which are illustrative only and not intended as limiting the invention to a particular embodiment.

EXAMPLE 1

Monomers in which the bulky organic group was a t-butyl group and the alkyl groups were hexyl groups were made as follows. 4-hydroxybenzoic acid was dissolved in 30% ethanolic KOH. About 1% of KI was added as a catalyst. The mixture was heated to about 60° C. and a stoichiometric amount of 6-chloro-1-hexanol was slowly added over about ½ hour. After refluxing the reaction mixture for extended period of time (2–15 hrs) the contents were cooled, the reaction mixture was filtered off, and the filtrate solvent was evaporated under vacuum. Water was added into the residue and acidified with HCl and the precipitate was filtered and crystallized with ethanol, yielding approximately an 80% 4-(6-hydroxyhexyloxy)-benzoic acid.

Next, 4-(6-hydroxyhexyloxy benzoic acid was refluxed with a stoichiometric amount of acrylic acid in an excess of cyclohexane as solvent. A catalytic amount of p-TSA was added, along with an appropriate polymerization inhibitor. The flask of the above contents was fitted with a condenser and Dean Stark trap. When the theoretical amount of water was taken off, the contents were cooled to recover 4-(6-acryloxy-hexyloxy)benzoic acid (II) after a brief work-up.

The chloroform solution containing 4-(6-acryloxy-hexyloxy)benzoic acid (II) was converted to the acid chloride by the slow addition (over about 1 hour) of stoichiometric amount of an neat oxalyl chloride. After stirring for 4–5 hours, solvent/reagent were distilled off. The di-sodium salt of 2-t-butyl-hydroquinone was prepared by adding stoichiometric NaH to a 10% solution of 2-t-butyl hydroquinone in anhydrous THF (tetrahydrofuran) at room temperature. After hydrogen evolution ceased in the anhydrous THF solution, the acid chloride of 4-(6-acryloxy-hexyloxy) benzoic acid (II) was slowly added to 2-t-butyl-hydroquinone (di-sodium salt) solution under nitrogen atmosphere. The contents were filtered over chromatographic silica gel to remove the salts and the solvents in filtrate were removed in vacuo leaving about 60% of 1,4-bis(4-(6-acryloyl-1-hexyloxy)benzoyloxy)2-t-butylbenzene (IV) and about 40% of a by-product having one terminus being an oligomeric ester byproduct, namely 2-(t-butyl), 1-[4-(6-acryloxy-hexyl-1-oxy)-benzoyloxy], 4-[4-{6-(3-acryl oxy-propionoxy)-hexyl-1-oxy}-benzoyloxy]-benzene [(V); "MLAP"].

EXAMPLE II

The methacrylate analog, or 1,4-bis(4-(6-methacryloyloxy-1-hexyloxy)benzoyloxy)2-t-butylbenzene, was synthesized using the method of Example 1 by simply replacing acrylic acid with methacrylic acid. The result was an 80% yield of 1,4-bis(4-(6-methacryloyloxy-hexyl-1-oxy)benzoyloxy)2-(t-butyl) benzene, which remained nematic liquid crystalline between room and mouth temperatures and could be polymerized to isotropic polymer with about 2% volume shrinkage compared with >8% for the conventional control (GTE). Unlike the synthesis of its acrylate homolog, the recovery was not split by a sizable amount of MLAP by-product.

Simplified Method for Forming Key Intermediates

The method described above also provides a neat procedure for the mono-esterification of 2-$R^3$-1,4-hydroquinone to yield 2-($R^3$)-4-[4-(ω-R-acryloxy-alkyl-1-oxy)-benzoyloxy]-phenol. In a preferred embodiment, 2-t-butyl-1,4-hydroquinone is mono-esterified to get 2-(t-butyl)-4-[4-(6-acryloxy-hexyloxy)-benzoyloxy]-phenol (III), which does not need an extensive purification, and is a very versatile intermediate for the synthesis of other very useful LC monomers.

Another intermediate, p-(ω-acryloxyalkyloxy)benzoic acid (II), preferably p-(ω-hydroxyhexyloxy)benzoic acid, was made using the foregoing reaction and using a very limited amount of solvents, inhibiting the polymerization and adapting a simpler purification procedure, with a potential for easy scale-up at later stages. The process produced a high yield of about 90% using the foregoing reaction.

Coupling of the monoester, 2-(t-butyl)-4-[4-(6-acryloxy-hexyloxy)-benzoyloxy]-phenol (III in FIG. 2) with (a) α,ω-dihaloalkanes or (b) α,ω-alkanediacyl halides or (c) alkyloxy-α,ω-bis-benzoyl halides leads to bridged ethers or esters having the general structures like (IX) in FIG. 2. These structural groups have a potential to exhibit similar polymerization characteristics as that of (IV and VI), and may be useful for blending purposes, as discussed below.

Blending of Monomers

Unfortunately, metastability became a significant problem when attempts were made to formulate filled resin systems. Surprisingly, when silica filler was added to the C6-t-butyl diacrylate monomer, crystallization occurred within a few minutes. The cure shrinkage of unfilled C6-t-butyl diacrylate monomer was temperature dependent, increasing rapidly as the N→I transition temperature was approached. With N→I transition temperatures just slightly above mouth temperature, monomers such as the C6-ty-butyl diacrylate monomer present a threat of unacceptably high polymerization shrinkage at the desired use temperature.

EXAMPLE 3

Two-tenths of a gram of C6-t-butyl dimethacrylate LC monomer was mixed with 0.8 gram 1.5 μm γ-methacryloxy propyltrimethoxy silane treated fused silica to produce an 80% w/w mixture. Mixing was done by hand using an agate mortar and pestle over a period of about 20 minutes. The resultant composite had the consistency and appearance of a commercial dental restorative resin. But, within about 5 minutes after completion of the mixing, the mixture was found to be solid, the LC monomer crystallized. The resultant material was unworkable, being a frangible solid, even without photoinitiation.

Because of the long-term stability of the monomer in the nematic LC metastable state, even in the presence of potentially nucleating surfaces (i.e., the glass container), this result was unexpected.

In an attempt to solve this crystallization problem, the 60/40 diacryl-MLAP product was substituted for the pure monomer. The working rationale was that the difference in structures between the two constituents would cause each to disrupt the crystalline regularity of the other, thus hindering crystallization.

An 80% w/w blend of the 60/40 diacryl-MLAP product with 1.5 μm γ-methacryloxy propyltrimethoxy silane has resisted crystallization at room temperature for over 6 months. Similar results were obtained with two commercial radiopaque glass fillers.

Unfortunately, the 60/40 diacryl-MLAP product exhibited twice the polymerization shrinkage of the original monomer, alone (4.2 vs. 2.0 percent volumetric), and nearly as much as the reference conventional monomer system (GTE, 8.2 percent).

Other Monomers for Forming Blends

An investigation was undertaken to determine new LC analogs suitable for blending with the bifunctional terminated, nematic LC monomers, preferably C6-t-butyl-dimethacrylate monomer, to inhibit polymerization upon addition of filler. The following monomers were synthesized and their volumetric shrinkages (NIST dilatometer) were measured and compared to the original monomer. The results are given in the following Table:

| Monomer Structure | Shorthand Name | Mean Shrinkage, % |
|---|---|---|
| (structure) | C6-t-butyl-dimethacrylate | 2.004 |
| (structure) | C6-di-t-butyl-dimethacrylate | Indeterminate (crystalline) |
| (structure) | C6-phenyl-dimethacrylate | 1.625 |

The di-t-butyl derivative was crystalline at room temperature and the polymerization shrinkage could not be determined for the pure monomer. The phenyl derivative actually had a significantly lower shrinkage (p=0.01) at a similar degree of conversion, 55 vs. 58%. Selected mixtures of these monomers were compared with the reference, GTE, the original C6-t-butyl-dimethacrylate monomer, the original C6-t-butyl-diacrylate monomer, and the spontaneously formed reaction byproduct mixture described earlier, with the following results:

|  | Monomer(s) | Shrinkage, % vol. ± s.d. (n = 4) |
|---|---|---|
| Pure Monomers | GTE | 8.2 |
|  | C6-t-butyl-diacrylate (IV) | 2.3 |
|  | C6-t-butyl-dimethacrylate (VI) | 2.0 |
|  | C6-phenyl-dimethacrylate (VII) | 1.6 |
|  | Acrylate reaction byproduct (V) | 7.6 |
| Mixtures | C6-t-butyl-dimethacrylate (VI) + C6-di-t-butyl-dimethacryalte (3:1) | 3.9 |
|  | C6-t-butyl-dimethacrylate (VI) + C6-di-t-butyl-dimethacryalte (1:1) | 3.4 |
|  | C6-t-butyl-dimethacrylate (VI) + C6-phenyl-dimethacrylate (VII) (3:1) | 2.0 |
|  | C6-t-butyl-dimethacrylate (VI) + C6-phenyl-dimethacrylate (VII) (1:3) | 2.1 |
|  | C6-t-butyl-diacrylate (VI) + MLAP (V) (3:2) | 4.2 ± 0.2 |

The pure acrylate and methacrylate LC monomers yielded about one fourth the volumetric shrinkage of the reference monomer system (GTE). Blends with the di-t-butyl derivative yielded shrinkages about twice that of the pure t-butyl monomer. Blends with the phenyl derivative yielded shrinkages equivalent to that of the pure t-butyl monomer. The spontaneously formed di-acrylate blend resulted in a shrinkage approximately twice that of the straight C6-t-butyl-diacrylate monomer. Based on the foregoing data, the phenyl derivative emerged as a preferred diluent or "secondary monomer."

To test the hypothesis that blends of the foregoing monomers would be resistant to crystallization when filled, a variety of formulations were made using a primary monomer, specifically C6-t-butyl-dimethacrylate or C6-t-butyl-diacrylate, blended with a secondary monomer, specifically C6-phenyl-dimethacrylate or the MLAP byproduct, respectively, mixed with either 80% w/w 1.5 μm silanized fused silica powder (3M, St. Paul, Minn.) or 72% w/w small particle size glass filler (Bisco, Schaumburg, Ill.). All monomers were photoinitiated with 1% w/w camphoroquinone and 0.5% w/w dimethylaminoethyl methacrylate. Mixing was performed using an agate mortar and pestle followed by outgassing for 10 minutes under house vacuum and gentle reconsolidation. None of the tested formulations crystallized over the period monitored (at least one week for all, and over 4 months for the spontaneous mixture of C6-t-butyl-diacrylate and its reaction byproduct). The resulting shrinkages are shown in the following table.

| Monomer | Filler | Shrinkage | Quality |
|---|---|---|---|
| C6-t-butyl-dimethacrylate (VI) + C6-phenyl-dimethacrylate (VII) (3:1) | Silica Glass | 0.67 0.49 | + + |
| C6-t-butyl-dimethacrylate (VI) + C6-phenyl-dimethacrylate (VII) (1:3) | Silica Glass | 0.89 — | + − |
| C6-t-butyl-diacrylate (IV) + MLAP (V) (3:2) | Silica Glass Glass | 0.84 ± 0.04 1.6 ± 0.1 1.6 ± 0.1 | + + + |

*A "+" in the Quality column indicates that the cured product was qualitatively a hard, rigid, translucent resin resembling a commercial dental resin composite. A "−" indicates that the cured specimens were soft and frangible.

All of the foregoing systems resisted crystallization when highly filled. All of the foregoing systems also cured to hard, rigid materials, with the exception of the glass filled butyl-phenyl derivative blend. The glass filler may not be as compatible with the LC monomers as with conventional matrix resins. All glass based mixtures had consistencies that differed from those of commercial composites and an experimental 72% w/w filled GTE resin. In contrast, the silica filled resins handled very much like conventional monomer based resin composites. Similar experimental composites made with the pure phenyl derivative monomer did not spontaneously crystallize, but also yielded soft, frangible cured resins.

Ultra-low Shrinkage Polymerizable Highly Filled Resin Composites

In order to determine the best formulation of ratios and combinations of monomers, when combined with different commercially available fillers, many composites were formulated and their polymerization shrinkage, hardness, toughness, crystallinity, and other physical properties related to restorative potential evaluated.

The resulting shrinkages (in triplicate) were as follows:

| | |
|---|---|
| 25% 2t-bu-dimethacrylate $CH_3$—C6LC (VI)- 75% 2-ph-dimethacrylate $CH_3$—C6LC (VII) | 0.710 ± 0.107 |
| 75% 2t-bu-dimethacrylate $CH_3$—C6LC (VI)- 25% 2-ph-dimethacrylate $CH_3$-C6LC (VII) | 0.666 ± 0.155 |
| 60% 2t-bu-diacrylate C6LC (IV)- 40% 2t-bu-MLAP-diacrylate C6LC (V) | 0.840 ± 0.050 |
| 75% 2t-bu-dimethacrylate $CH_3$—C6LC (VI)- 25% 2t-bu-MLAP-diacrylate C6LC [(IV) + (V);3:2] | 1.183 ± 0.403 |

Additional results are given in Table 1.

TABLE 1

Volume % Shrinkage of New LC-monomers with and without filler

| LC-monomers Type | Volume (%) Shrinkage of monomers with and without filler | | | |
|---|---|---|---|---|
| | No filler | silica filler (80%) | Bisco filler (72%) | lab-silica filler (80%) |
| GTE | 8.212 | 2.483 | — | — |
| 2t-bu-Pure diacrylate C6LC (IV) | 2.252 | — | — | — |
| 2t-bu-Pure By-product of diacrylate C6LC (V) | 7.645 | — | — | — |
| 2t-bu-Pure dimethacrylate $CH_3$-C6LC (VI) | 2.004 | crystallized | crystallized | — |
| 2-ph-Pure dimethacrylate $CH_3$-C6LC (VII) | 1.625 | — | 1.429 (Soft) | — |
| 2t-bu$CH_3$C6LC + 2,5 ditert-$CH_3$C6LC(75:25)(VI & VIII) | 3.874 | — | — | — |
| 2t-bu$CH_3$C6LC + 2,5 ditert-$CH_3$C6LC(50:50)(VI & VIII) | 3.414 | — | — | — |
| 2t-bu$CH_3$C6LC + 2-ph-$CH_3$C6LC (3:1)(VI & VII) | — | 0.666 | 0.494 | — |
| 2t-bu$CH_3$C6LC + 2-ph-$CH_3$C6LC (1:3) (VI & VII) | — | 0.893 | — (Soft) | — |
| 2t-bu-Pure diacrylateC6LC + its by-product (3:2)(IV&V) | 4.243 | 0.841 | 1.352 | 1.183 |
| Bisco monomer | — | — | 3.339 | — |

The best properties were shown by a mixture of 2-t-bu-diacrylate and MLAP byproduct at a 3:2 ratio. Therefore, this sample was selected for further testing with various other filler systems (silinated as well as non-silinated) and the data are recorded in Table 2. The least polymerization shrinkage of 0.841±0.0404 was exhibited by an 80% wt. loading of silica filler silinated by 3M.

TABLE 2

Effect on the Volume % Shrinkage with different Filler System: in C6LC r.m* (3:2 IV & V) monomers

| Sample No. | filler 0 % | 80% silica filler silinated by 3M | Bisco filler 72% | 80% silica filler silinated in lab | 82% Raysorb T-3000 | 77% Raysorb Aged |
|---|---|---|---|---|---|---|
| 1 | 4.328 | 0.839 | 1.517 | 1.352 | 1.415 | 1.749 |
| 2 | 4.306 | 0.791 | 1.595 | 1.189 | 1.143 | 1.502 |
| 3 | 3.841 | 0.891 | 1.778 | 1.386 | 1.205 | 1.615 |
| 4 | 4.496 | | 1.504 | | | |
| Mean | 4.2425 | 0.841 | 1.5985 | 1.309 | 1.2543 | 1.622 |
| sd | ±0.2437 | ±0.0404 | ±0.1093 | ±0.086 | ±0.1164 | ±0.1010 |

*"C6LC r.m." is the mixture of Diacrylate liquid crystal monomer and its reaction by-product in a 3:2 ratio Use of Secondary Monomer with Higher Transition Temperature To test the feasibility of using a secondary monomer having a comparatively higher N→I than the primary monomer to raise the N→I transition temperature of the blend, a model system was examined using non-polymerizable LC compounds synthesized as intermediates in the synthesis of new monomers. For example, C6-t-butyl-dimethacrylate LC monomer was blended with a non-polymerizable C6-t-butyl-dichloro analog. The N→I transition temperature increased linearly with dilution with the higher N→I compound, while the freezing point (not shown) actually was suppressed. This behavior is hereinafter referred to as the "linear rule of mixtures" behavior.

"Bridged monomers" that are suitable for use as secondary monomers having a comparatively higher N→I, have the following general structure:

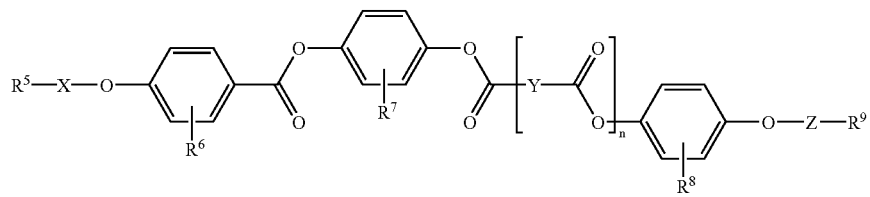

n is selected from the group of 0 and 1;

X is selected from the group consisting of linear and branched alkyl groups having from about 2 to about 12 carbon atoms, preferably having from about 2 to about 10 carbon atoms, more preferably having from about 2 to about 6 carbon atoms, and most preferably having about 6 carbon atoms;

Y is selected from the group consisting linear and branched alkyl groups having from about 2 to about 12 carbon atoms, preferably having from about 2 to about 10 carbon atoms, more preferably having from about 2 to about 6 carbon atoms, and most preferably having about 6 carbon atoms;

Z is selected from the group consisting of alkyl groups and methyl-substituted alkyl groups having from about 2 to about 12 carbon atoms, preferably having from about 2 to about 10 carbon atoms, more preferably having from about 2 to about 6 carbon atoms, and most preferably having about 6 carbon atoms; provided that, when n is 0, Z is further selected from the group consisting of 2-alkyl-1,4-bis[-4-(alkyl-6-yl-1-oxo)-benzoyloxy]-benzene and, when n is 1, Z is further selected from the group consisting of 4-oxoalkyl-benzoyl groups, wherein said alkyls have from about 2 to about 12 carbon atoms, preferably from about 2 to about 10 carbon atoms, more preferably from about 2 to about 6 carbon atoms, and most preferably 6 carbon atoms.

$R^7$ is a "bulky organic group," defined herein as an organic group having a bulk greater than $R^6$ and $R^8$, said bulk being adapted to provide sufficient steric hindrance to achieve a nematic state at room temperature while suppressing crystallinity of liquid crystal monomers made using the mesogens at room temperature. The result is effective rheology and workability at room temperature. Suitable $R^2$ groups generate asymmetry in the packing of the molecules, and include, but are not necessarily limited to t-butyl groups, phenyl groups, isopropyl groups, and secondary butyl groups. Most preferred $R^2$ groups are t-butyl groups and phenyl groups; and $R^6$ and $R^8$ are selected from groups less bulky than $R^2$, preferably selected from the group consisting of hydrogen atoms and methyl groups;

$R^5$ and $R^9$ are polymerizable groups selected from the group consisting of nucleophiles and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Preferred electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms.

In a preferred embodiment, $R^2$ is selected from the group of a t-butyl group and a phenyl group, X and Z are hexyl groups, Y is selected from the group consisting of nothing (when n is 0) a hexyl group, and one of R and $R^4$ is selected from the group consisting of an acryl group and a methacryl group.

The following are specific examples of suitable bridged monomers that fall within the foregoing generic structure.

Bridged Monomer 1:

A first bridged monomer is α,ω-bis-4-[4-{4-(ω-R-acryloxy-alkyloxy)-benzoyloxy}-2-$R^7$-phenoxy carbonyl]-phenoxy-alkane, preferably α,ω-bis-4-[4-{4-(ω-R acryloxy-alkyloxy)-benzoyloxy}-2-t-butyl phenoxy carbonyl]-phenoxy-alkane:

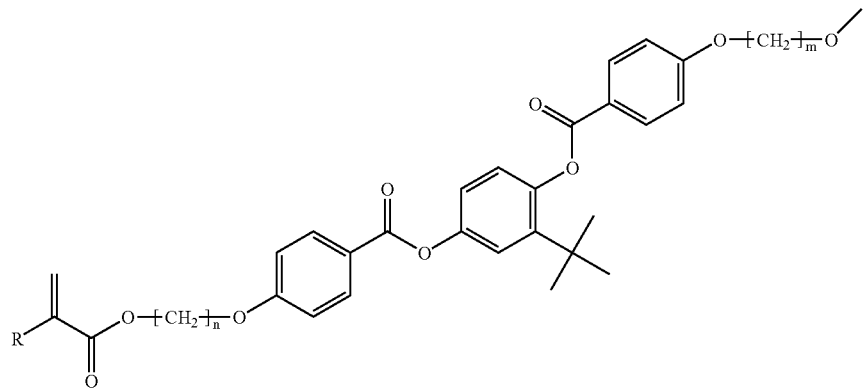

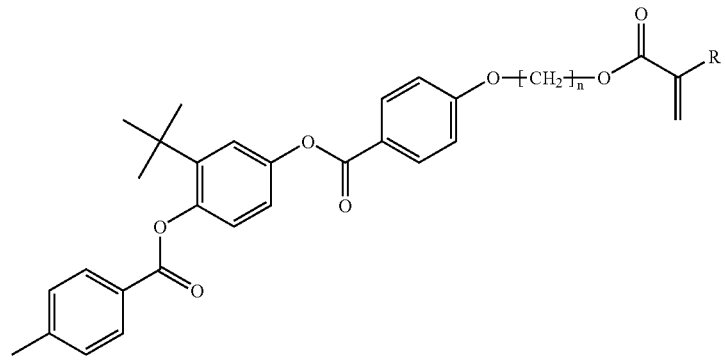

wherein n and m independently are selected from the group consisting of 2 to 12, preferably 2 to 10, more preferably 2 to 6, and most preferably 6, and R is selected from the group consisting of hydrogen and a methyl group. The "G6-C6-C6 bridged dimethacrylate LC monomer") is shown below:

in FIG. 2), in anhydrous tetrahydrofuran under nitrogen atmosphere. The contents are filtered over chromatographic silica gel to remove the salts, and the solvents in filtrate are removed in vacuo leaving α,ω-bis-4-[4-{4-(ω-R acryloxy-alkyloxy)-benzoyloxy}-2-$R^7$-phenoxy carbonyl]-phenoxy-

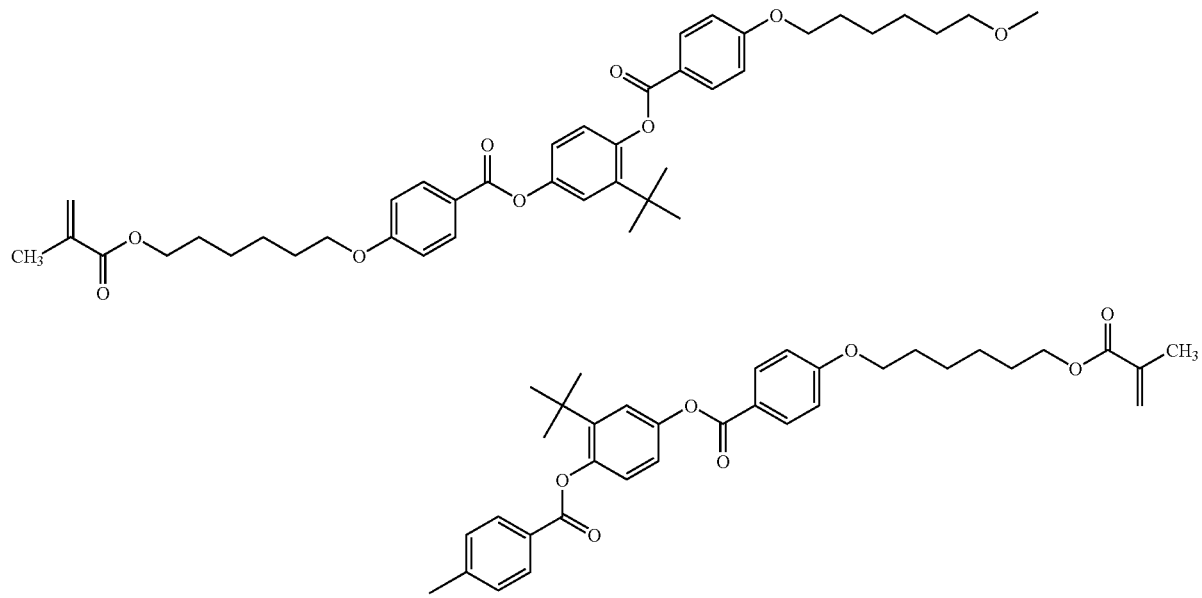

The optimized minimum energy configuration of the C6-C6-C6 bridged dimethacrylate LC monomer is shown below. As can be seen, this molecule has the rod-like structure characteristic of nematic liquid crystals.

The molecule should have a broad nematic mesophase stability range extending from about 20° C. to about 142° C.

For the synthesis of this new bridged monomer, a new intermediate, namely alkyl-α,ω-bis-phenoxy-4-benzoic acid, is synthesized by reacting p-hydroxy benzoic acid with α,ω-dihaloalkane, preferably α,ω-dichloroalkane, under alkaline conditions and using a suitable condensation catalyst, preferably KI. The carboxyl group of this intermediate is then activated to its acid halide, preferably its acid chloride, by refluxing with a suitable carboxylic acid chlorinating agent, such as thionyl chloride, sulfuryl chloride, oxalyl chloride etc., preferably oxalyl chloride. After removal of the reagent/solvent under vacuum, alkyl-α,ω-bis-phenoxy-4-benzoyl halide, preferably alkyl-α,ω-bis-phenoxy-4-benzoyl chloride is obtained. The alkyl-α,ω-bis-phenoxy-4-benzoyl chloride is reacted with an ionically activated salt, preferably the sodium salt, of 2-($R^7$)-4-[4-(6-acryloxy-alkyloxy)-benzoyloxy]-phenol, preferably 2-(t-butyl)-4-[4-(6-acryloxy-hexyloxy)-benzoyloxy]-phenol (III alkane, preferably α,ω-bis-4-[4-{4-(ω-R-acryloxy-alkyloxy)-benzoyloxy}-2-t-butyl phenoxy carbonyl]-phenoxy-alkane in good yield.

Bridged Monomer 2

A second suitable bridged monomer is 2-($R^7$)-1-[4-(ω-R-acryloxy-alkyl-α-oxy)-benzoyloxy], 4-[ω-{4-(ω'-R-acryloxy-alkyl-α-oxy)-benzoyloxy}-α-alkyloyloxy]-benzene, preferably 2-(t-butyl)-1-[4-(ω-R-acryloxy-alkyl-α-oxy)-benzoyloxy], 4-[ω-{4-(ω'-R-acryloxy-alkyl-α-oxy)-benzoyloxy}-α-alkyloyloxy]-benzene:

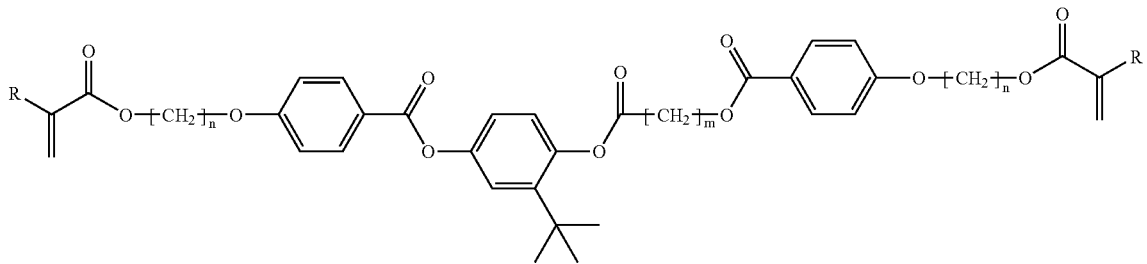

In the foregoing structure, n and m designate the number of carbon atoms in the alkyls, which is from about 2 to about 12, preferably from about 2 to about 10, more preferably from about 2 to about 6, most preferably 6; R is H or $CH_3$.

Molecules of this type are made, generally, using two key intermediates described earlier. The sodium salt of 2-($R^7$)-4-[4-(ω-R-acryloxy-alkyloxy)-benzoyloxy]-phenol (III in FIG. 2) is treated with an equimolar amount of ω-halo-α-alkanoyl halide, preferably ω-chloro-α-alkanoyl chloride, in THF. After purification, the product is 2-($R^7$)-1-[4-(ω-R- acryloxy-alkyl-α-oxy)-benzoyloxy], 4-(ω-halo-α-alkanoyloxy)-benzene, preferably 2-(t-butyl)-1-[4-(ω-R-acryloxy-alkyl-α-oxy)-benzoyloxy], 4-(ω-chloro-α-alkanoyloxy)-benzene. The terminal halo group of this intermediate, preferably a chloro group, is used for esterification of the intermediate 4-(ω-R-acryloxy-alkyloxy) benzoic acids (II in FIG. 2), after its conversion to its ionically active salt, preferably to its sodium salt by treatment with NaH. The product is 2-(R$^7$)-1-[4-(ω-R-acryloxy-alkyl-α-oxy)-benzoyloxy], 4-[ω-{4-(ω'-R-acryloxy-alkyl-α-oxy)-benzoyloxy}-α-alkyloyloxy]-benzene, preferably 2-(t-butyl)-1-[4-(ω-R-acryloxy-alkyl-α-oxy)-benzoyloxy], 4-[ω-{4-(ω'-R-acryloxy-alkyl-α-oxy)-benzoyloxyl}-α-alkyloyloxy]-benzene.

The detailed synthesis wherein R$^7$ is a t-butyl group, R is hydrogen, and the alkyl is a hexyl group and is described as follows: The sodium salt of 2-(t-butyl)-4-[4-(6-acryloxy-hexyloxy)-benzoyloxy]-phenol (III in FIG. 2) is treated with an equimolar amount of ω-chloro-α-alkanoyl chloride in anhydrous THF under nitrogen atmosphere for 4–5 hours. After purification by filtration over silica gel and the removal of solvents under reduced pressure, the product 2-(t-butyl)-1-[4-(6-acryloxy-hexyl-α-oxy)-benzoyloxy], 4-(ω-chloro-α-hexanoyloxy)-benzene, is isolated.

An equimolar amount of 4-(6-acryloxy-hexyloxy)benzoic acid (II in FIG. 2) is dissolved in anhydrous THF and reacted with sodium hydride (1.1 mol equivalent) for 2 hrs under nitrogen atmosphere at −35° C. After hydrogen evolution ceases, a THF solution of the equimolar quantity of 2-(t-butyl)-1-[4-(6-acryloxy-hexyl-α-oxy)-benzoyloxy], 4-(ω-chloro-α-hexanoyloxy)-benzene is introduced into the reaction vessel slowly. The reaction mixture is stirred at room temperature for 4–5 hours. The contents are filtered over chromatographic silica gel to remove the salts and the solvents in filtrate are removed in vacuo leaving a respectable yield of 2-(t-butyl)-1-[4-(6-acryloxy-hexyl-α-oxy)-benzoyloxy], 4-[6-{4-(6'-acryloxy-hexyl-α-oxy)-benzoyloxy}-α-hexyloyloxy]-benzene.

Where n=m=6, the structure essentially is the C6BM monomer with an additional (CH$_2$)$_6$COO spacer group bridging adjacent phenyl groups:

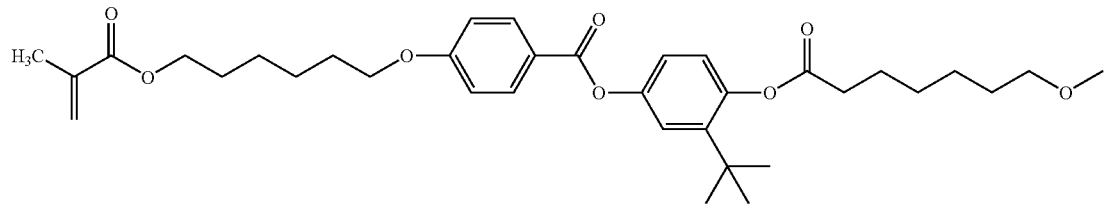

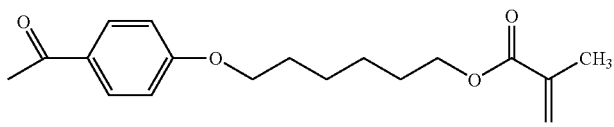

Bridged Monomer 3

A third suitable bridged monomer is nonanedioic acid-α,ω-bis-(2-R$^7$)-4-[4-{ω-(2-R-acryloyloxy)-alkyloxy}-benzoyloxy]-phenyl ester, wherein the alkyl groups comprise from about 2 to about 12 carbon atoms, preferably 2 to about 10 carbon atoms, more preferably from about 2 to about 6 carbon atoms, most preferably 6 carbon atoms. This molecule has the following general structure:

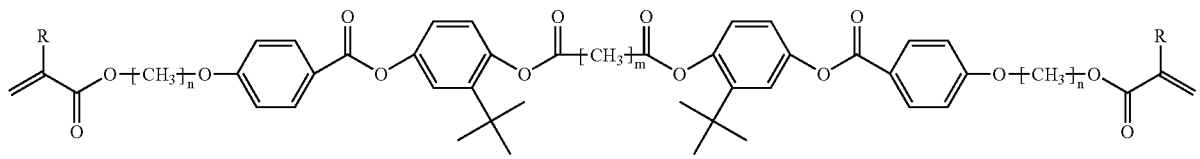

A preferred third bridged monomer, nonanedioic acid-α,ω-bis-(2-t-butyl)-4-[4-{6-(2-methyl-acryloyloxy)-hexyloxy}-benzoyloxy]-phenyl ester, has the following general structure:

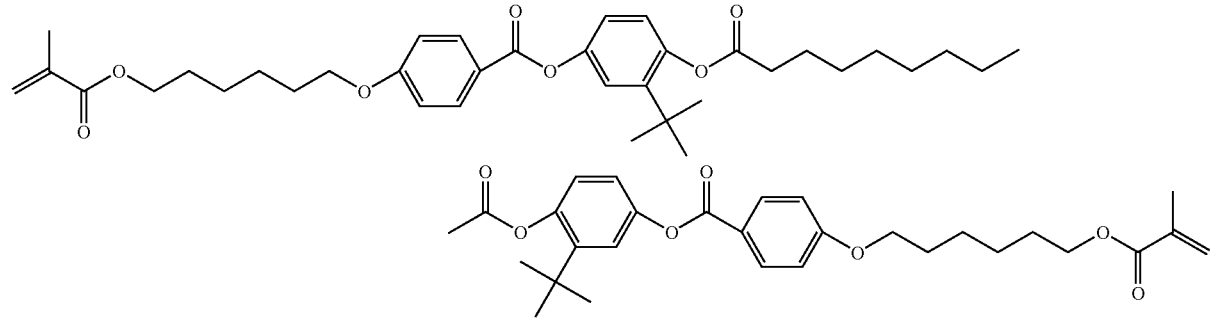

For the synthesis of these new monomers, a new intermediate, namely alkyl-α,ω-bis-phenoxy-4-benzoic acid is synthesized by reacting p-hydroxy benzoic acid with α,ω-dihaloalkane, preferably α,ω-dichloroalkane, in alkaline conditions and catalyzed by a suitable condensation catalyst, preferably KI. The carboxyl group of this intermediate is then activated to its halide, preferably to its chloride, by refluxing with an appropriate acid halogenating agent, preferably an acid chlorinating agent, such as thionyl chloride, sulfuryl chloride, oxalyl chloride etc. A most preferred acid chlorinating agent is oxalyl chloride. After removal of the reagent/solvent under vacuum, alkyl-α,ω-bis-phenoxy-4-benzoyl chloride is obtained, which is reacted with the sodium salt of 2-($R^7$)-4-[4-(6-acryloxy-alkyloxy)-benzoyloxy]-phenol, preferably 2-(t-butyl)-4-[4-(6-acryloxy-hexyloxy)-benzoyloxy]-phenol (III in FIG. 2) in anhydrous tetrahydrofuran under nitrogen atmosphere.

The specific synthesis of nonandioic-α,ω-bis-(2-t-butyl)-4-[4-{6-(2-methyl-acryloyloxy)-hexyloxy}-benzoyloxy]-phenyl ester is outlined below:

Nonanedioic acid is treated with an excess of neat oxalyl chloride at room temperature for 2–3 hours. The excess of oxalyl chloride is removed in-vacuo to get sufficiently pure nonanedioic acid chloride. In a separate vessel, 2-(t-butyl)-4-[4-(6-acryloxy-hexyloxy)-benzoyloxy]-phenol (III in FIG. 2) is reacted with sodium hydride (1.1 molar equivalent) in anhydrous tetrahydrofuran under nitrogen atmosphere at –35° C. After the evolution of hydrogen ceases, an equimolar amount of nonanedioic acid chloride in anhydrous THF is added to this reaction vessel slowly under nitrogen atmosphere at –35° C. After all of the nonanedioic acid chloride is added, the reaction is allowed to stir at room temperature for 4–5 hours. The contents are filtered over chromatographic silica gel to remove the salts and the solvents in filtrate are removed in vacuo leaving nonanedioic-α,ω-bis-(2-t-butyl)-4-[4-{6-(2-methyl-acryloyloxy)-hexyloxy}-benzoyloxy]-phenyl ester in good yield.

Testing of Filled Products

Blends of the foregoing bridged monomers with C6BM are made using the linear rule of mixtures behavior to achieve a nematic to isotropic transition temperature of about 50° C. or more, preferably 60° C. or more. The mixtures are tested to determine cure shrinkage neat and filled with 80% w/w small particle glass filler, and to verify that the mixtures do not crystallize at controlled room temperature, or 20° C. Accelerated crystallization resistance testing is also performed at 4° C. for those mixtures with freezing points above that temperature.

Suitable blends meet the following criteria: nematic to crystallization temperature ($T_{N \rightarrow Cr}$) of about 20° C. or lower; $T_{N \rightarrow I}$ of about 40° C. or higher, preferably about 45° C. to about 70° C., although any higher limit is acceptable provided that it is not accompanied by a viscosity which makes the material unusable for the intended purpose, a preferred purpose being for dental restorative purposes; change in volume at curing ($\Delta V_{curing}$) of about 4% or less (neat); $\Delta V_{curing}$ of about 1% or less (filled); no crystallization at 20° C. for about 6 months or more, preferably about 12 months or more, more preferably about 2 years or more, most preferably 4 years or more (filled). For filled systems that do not freeze above 4° C., no crystallization at 4° C. for about 2 months or more (filled) will be substituted for the last criterion. More preferred blends will meet the following criteria: $T_{N \rightarrow Cr} > 10°$ C.; $T_{N \rightarrow I} > 60°$ C.; $\Delta V_{curing} < 4\%$ (neat); $\Delta V_{curing} < 1\%$ (filled); no crystallization at 20° C. for 6 months or more (filled). For filled systems that do not freeze above 4° C., no crystallization at 4° C. for 2 months or more (filled) will be substituted for the last criterion.

The fracture toughness of cured blends is tested using defined crack compact tensile samples (ASTM E399) fabricated by photocuring C6BM monomer with initiator and activator in silicone molds. After surfacing samples with 600 grit SiC paper and soaking in physiologic saline at 37° C. for 24 hours, the samples are tested at room temperature under displacement control at 1 mm/min until failure. The C6BM monomer synthesized in this study yielded a cross-linked polymer with a somewhat lower cross-link density at the same degree of conversion when compared with the GTE reference system, because of the LC monomer's higher molecular weight. Not surprisingly, the fracture toughness of the crosslinked, glassy C6BM is 0.5 MPa/$m^2$—which is identical to that found for the photocured, isotropic conventional matrix resin GTE. The fracture toughness of the crosslinked, cured resin blend is as high as possible, suitably 0.4 Mpa-$m^{1/2}$ or higher, preferably 0.5 MPa-$m^{1/2}$ or higher.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A resin blend comprising inorganic filler and primary liquid crystal monomer at a ratio to secondary monomer, said ratio and said secondary monomer being adapted to maintain said resin blend in a nematic liquid crystalline state for about 4 hours or more after addition of said inorganic filler at a temperature of 20° C., wherein said blend exhibits about 2 vol. % or less polymerization shrinkage, wherein said liquid crystal monomer has the following general structure:

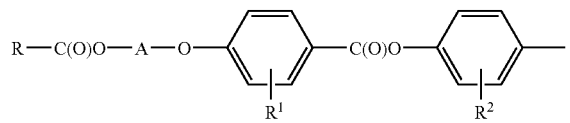

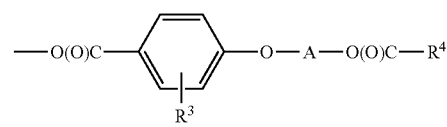

wherein:
R² is selected from the group consisting of t-butyl groups, phenyl groups, isopropyl groups, and secondary butyl groups;

A is selected from the group consisting of branched and linear alkyl groups having from about 2 to about 10 carbon atoms, wherein said branched alkyl groups comprise branches having from about 1 to about 4 carbon atoms; and R and R⁴ are acryloyl groups and methacryloyl groups; wherein said secondary monomer has the following general structure:

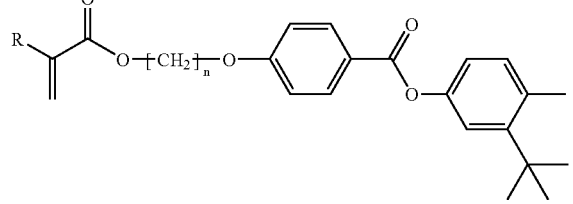

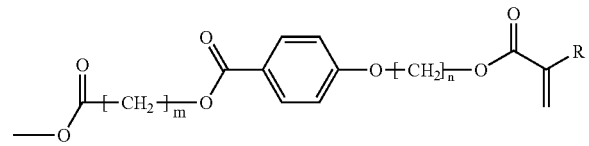

wherein n and m independently are selected from the group consisting of from about 2 to about 12; and R is selected from the group consisting of H and CH₃.

2. The resin blend of claim 1 wherein n and m independently are selected from the group consisting of from about 2 to about 10.

3. The resin blend of claim 1 wherein n and m independently are selected from the group consisting of from about 2 to about 6.

4. The resin blend of claim 1 wherein n and m are 6.

5. A resin blend comprising inorganic filler and primary liquid crystal monomer at a ratio to secondary monomer, said ratio and said secondary monomer being adapted to maintain said resin blend in a nematic liquid crystalline state for about 4 hours or more after addition of said inorganic filler at a temperature of 20° C., wherein said blend exhibits about 2 vol. % or less polymerization shrinkage, wherein said liquid crystal monomer has the following general structure:

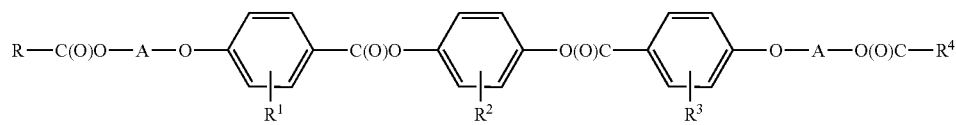

wherein:

R² is selected from the group consisting of t-butyl groups, phenyl groups, isopropyl groups, and secondary butyl groups;

A is selected from the group consisting of branched and linear alkyl groups having from about 2 to about 10 carbon atoms, wherein said branched alkyl groups comprise branches having from about 1 to about 4 carbon atoms; and R and R⁴ are acryloyl groups and methacryloyl groups;

wherein said secondary monomer has the following general structure:

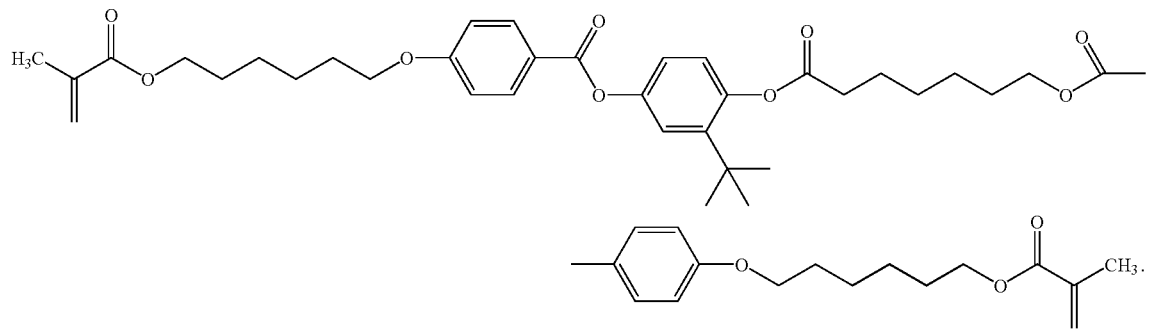

6. A resin blend comprising:

quantity of primary liquid crystal monomer having the following general structure:

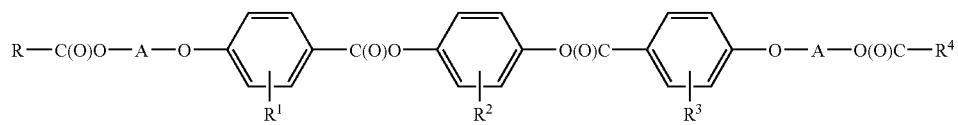

wherein A is selected from the group consisting of branched and linear alkyl groups having from about 2 to about 12 carbon atoms, wherein said branched alkyl groups comprise branches having from about 1 to about 4 carbon atoms; and a quantity of secondary monomer having the following structure:

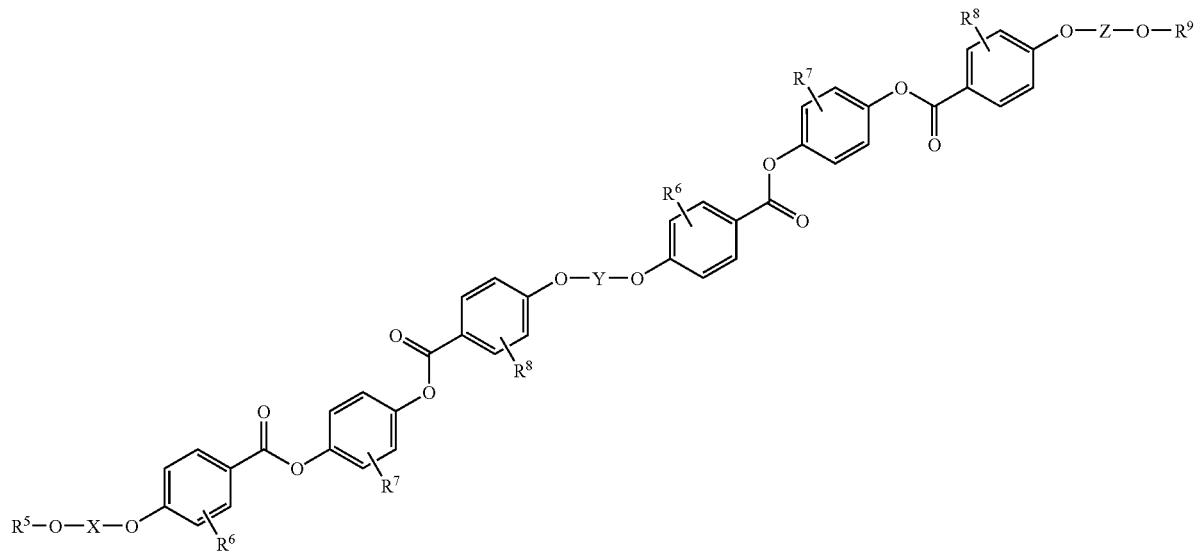

wherein:

X, Y, and Z independently are selected from the group consisting of linear and branched alkyl groups having from about 2 to about 12 carbon atoms;

$R^1$, $R^3$, $R^6$, and $R^8$ are selected from the group consisting of hydrogen atoms and methyl groups;

$R^2$ and $R^7$ independently are selected from the group consisting of t-butyl groups, phenyl groups, isopropyl groups, and secondary butyl groups; and, R, $R^4$, $R^5$ and $R^9$ are polymerizable groups selected from the group consisting of nucleophiles and electron deficient alkenes.

7. The resin blend of claim 6 comprising the primary liquid crystal monomer at a ratio to the secondary monomer, the ratio and the secondary monomer being adapted to maintain the resin blend in a nematic liquid crystalline state for about 30 minutes or more after addition of inorganic particulate filler at a temperature of 20° C., wherein said resin blend exhibits about 2 vol. % or less polymerization shrinkage.

8. The resin blend of claim 6 wherein the primary liquid crystal monomer is at about a 3:2 ratio to the secondary monomer.

9. The method of claim 6 wherein said polymerizable group is selected from the group consisting of ester groups, organic acid groups, amine groups, hydroxyl groups, and sulfhydryl groups.

10. The method of claim 6 wherein said polymerizable group is an electron deficient alkene independently selected from the group consisting of substituted and unsubstituted alkenyl ester groups comprising a polymerizable unsaturated carbon-carbon bond, wherein said alkenyl group has from about 2 to about 12 carbon atoms.

11. The method of claim 6 wherein said polymerizable group is an electron deficient alkene selected from the group consisting of alkenyl esters, acryloyl groups, methacryloyl groups.

12. The method of claim 6 wherein $R^4$, $R^5$ and $R^9$ independently are selected from the group consisting of acryloyl groups and methacryloyl groups.

13. The method of claim 8 wherein R, $R^4$, $R^5$ and $R^9$ independently are selected from the group consisting of acryloyl groups and methacryloyl groups.

14. The resin blend of claim 6 further comprising inorganic particulate filler.

15. The resin blend of claim 8 further comprising inorganic particulate filler.

16. The resin blend of claim 13 further comprising inorganic particulate filler.

17. The resin blend of claim 16 wherein the inorganic particulate filler comprises silicon.

18. The resin blend of claim 6 wherein $R^7$ independently is selected from the group consisting of t-butyl groups and phenyl groups.

19. The resin blend of claim 13 wherein $R^7$ independently is selected from the group consisting of t-butyl groups and phenyl groups.

20. The resin blend of claim 13 wherein $R^7$ is a t-butyl group.

21. The resin blend claim 6 wherein X, Y, and Z have from about 2 to about 10 carbon atoms.

22. The resin blend of claim 6 wherein X, Y, and Z have from about 2 to about 6 carbon atoms.

23. The monomer of claim 22 wherein X, Y, and Z have 6 carbon atoms.

24. The resin blend of claim 6 wherein the secondary monomer has the following general structure:

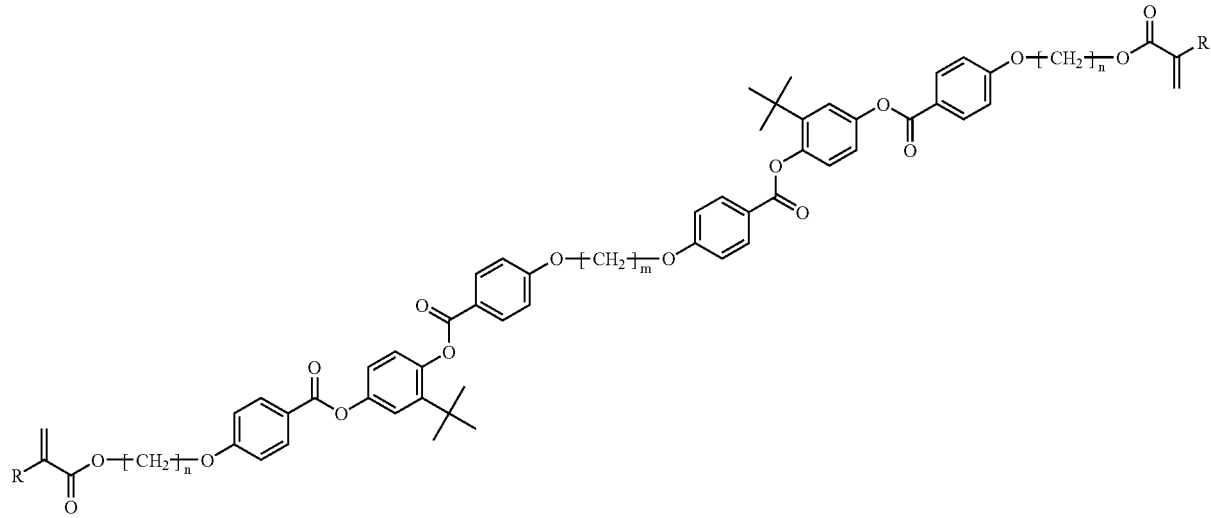

wherein n and m independently are selected from the group consisting of from about 2 to about 11.

25. The resin blend of claim 6 wherein the resin blend has a nematic to isotopic transition temperature of about 50° C., or more.

26. The blend of claim 25 wherein the nematic to isotopic transition temperature is about 60° C., or more.

27. A resin blend comprising:
an amount of primary liquid crystal monomer having the following structure:

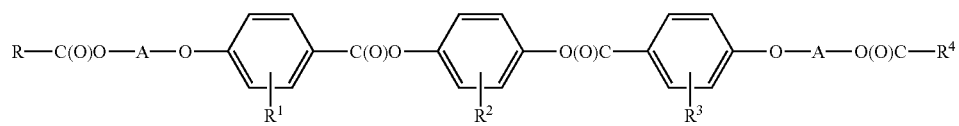

wherein A is selected from the group consisting of branched and linear alkyl groups having from about 2 to about 12 carbon atoms, wherein said branched alkyl groups comprise branches having from about 1 to about 4 carbon atoms; and a quantity of secondary monomer having the following structure:

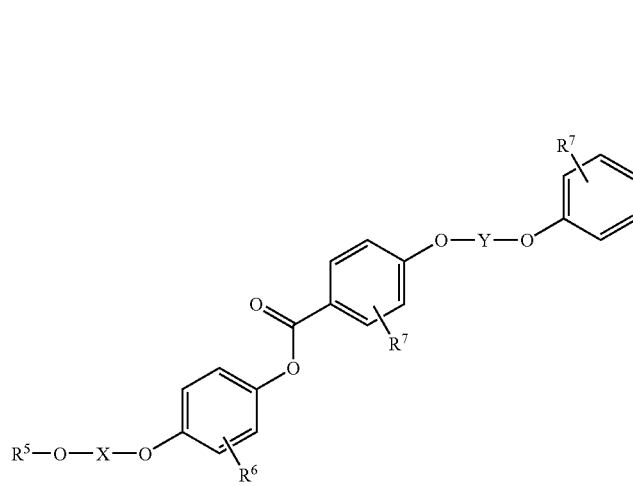

wherein:
X, Y, and Z independently are selected from the group consisting of linear and branched alkyl groups having from about 2 to about 12 carbon atoms;

$R^1$, $R^3$, $R^6$, and $R^8$ are selected from the group consisting of hydrogen atoms and methyl groups;

$R^2$ and $R^7$ independently are selected from the group consisting of t-butyl groups, phenyl groups, isopropyl groups, and secondary butyl groups; and, R, $R^4$, $R^5$ and $R^9$ are polymerizable groups selected from the group consisting of nucleophiles and electron deficient alkenes.

28. The resin blend of claim 27 wherein the amount of primary liquid crystal monomer is at a ratio to the quanity of secondary monomer, the ratio and the secondary monomer being adapted to maintain the resin blend in a nematic liquid crystalline state for about 30 minutes or more after addition of inorganic particulate filler at a temperature of 20° C., wherein said resin blend exhibits about 2 vol. % or less polymerization shrinkage.

29. The resin blend of claim 27 wherein the primary liquid crystal monomer is at about a 3:2 ratio to the secondary monomer.

30. The method of claim 27 wherein said polymerizable group is selected from the group consisting of ester groups, organic acid groups, amine groups, hydroxyl groups, and sulfhydryl groups.

31. The method of claim 27 wherein said polymerizable group is an electron deficient alkene independently selected from the group consisting of substituted and unsubstituted alkenyl ester groups comprising a polymerizable unsaturated carbon-carbon bond, wherein said alkenyl group has from about 2 to about 12 carbon atoms.

32. The method of claim 27 wherein said polymerizable group is an electron deficient alkene selected from the group consisting of alkenyl esters, acryloyl groups, methacryloyl groups.

33. The method of claim 27 wherein R, $R^4$, $R^5$ and $R^9$ independently are selected from the group consisting of acryloyl groups and methacryloyl groups.

34. The method of claim 29 wherein R, $R^4$, $R^5$ and $R^9$ independently are selected from the group consisting of acryloyl groups and methacryloyl groups.

35. The resin blend of claim 27 further comprising inorganic particulate filler.

36. The resin blend of claim 29 further comprising inorganic particulate filler.

37. The resin blend of claim 34 further comprising inorganic particulate filler.

38. The resin blend of claim 37 wherein the inorganic particulate filler comprises silicon.

39. The resin blend of claim 27 wherein $R^7$ independently is selected from the group consisting of t-butyl groups and phenyl groups.

40. The resin blend of claim 29 wherein $R^7$ independently is selected from the group consisting of t-butyl groups and phenyl groups.

41. The resin blend of claim 34 wherein $R^7$ independently is selected from the group consisting of t-butyl groups and phenyl groups.

42. The resin blend of claim 34 wherein $R_7$ is a t-butyl group.

43. The resin blend of claim 27 wherein X, Y, and Z have from about 2 to about 10 carbon atoms.

44. The resin blend of claim 27 wherein X, Y, and Z have from about 2 to about 6 carbon atoms.

45. The monomer of claim 42 wherein X, Y, and Z have 6 carbon atoms.

46. The resin blend of claim 27 wherein the resin blend has a nematic to isotopic transition temperature of about 50° C., or more.

47. The blend of claim 46 wherein the nematic to isotopic transition temperature is about 60° C., or more.

48. A resin blend comprising:
an amount of primary liquid crystal monomer having the following general structure:

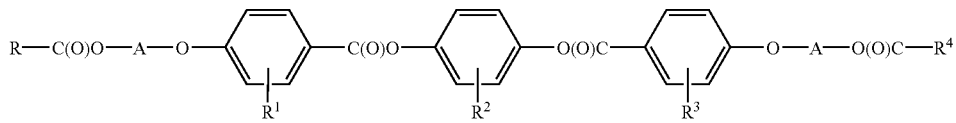

wherein A is selected from the group consisting of branched and linear alkyl groups having from about 2 to about 12 carbon atoms, wherein said branched alkyl groups comprise branches having from about 1 to about 4 carbon atoms; and a quantity of secondary monomer having the following structure:

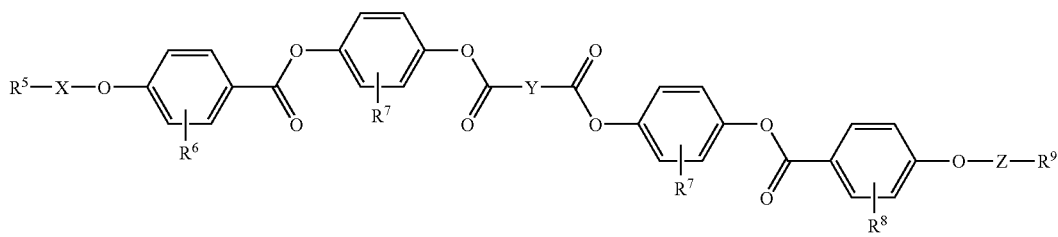

wherein:
  X, Y, and Z independently are selected from the group consisting of linear and branched alkyl groups having from about 2 to about 12 carbon atoms;
  $R^1$, $R^3$, $R^6$, and $R^8$ are selected from the group consisting of hydrogen atoms and methyl groups;
  $R^2$ and $R^7$ independently are selected from the group consisting of t-butyl groups, phenyl groups, isopropyl groups, and secondary butyl groups; and,
  R, $R^4$, $R^5$ and $R^9$ are polymerizable groups selected from the group consisting of nucleophiles and electron deficient alkenes.

49. The resin blend of claim 48 wherein the amount of primary liquid crystal monomer is at a ratio to the quantity of secondary monomer, the ratio and the secondary monomer being adapted to maintain the resin blend in a nematic liquid crystalline state for about 30 minutes or more after addition of inorganic particulate filler at a temperature of 20° C., wherein said resin blend exhibits about 2 vol. % or less polymerization shrinkage.

50. The resin blend of claim 48 wherein the primary liquid crystal monomer is at about a 3:2 ratio to the secondary monomer.

51. The method of claim 48 wherein said polymerizable group is selected from the group consisting of ester groups, organic acid groups, amine groups, hydroxyl groups, and sulfhydryl groups.

52. The method of claim 48 wherein said polymerizable group is an electron deficient alkene independently selected from the group consisting of substituted and unsubstituted alkenyl ester groups comprising a polymerizable unsaturated carbon-carbon bond, wherein said alkenyl group has from about 2 to about 12 carbon atoms.

53. The method of claim 48 wherein said polymerizable group is an electron deficient alkene selected from the group consisting of alkenyl esters, acryloyl groups, methacryloyl groups.

54. The method of claim 48 wherein R, $R^4$, $R^5$ and $R^9$ independently are selected from the group consisting of acryloyl groups and methacryloyl groups.

55. The method of claim 50 wherein R, $R^4$, $R^5$ and $R^9$ independently are selected from the group consisting of acryloyl groups and methacryloyl groups.

56. The resin blend of claim 48 further comprising inorganic particulate filler.

57. The resin blend of claim 48 further comprising inorganic particulate filler.

58. The resin blend of claim 55 further comprising inorganic particulate filler.

59. The resin blend of claim 58 wherein the inorganic particulate filler comprises silicon.

60. The resin blend of claim 48 wherein $R^7$ independently is selected from the group consisting of t-butyl groups and phenyl groups.

61. The resin blend of claim 50 wherein $R^7$ independently is selected from the group consisting of t-butyl groups and phenyl groups.

62. The resin blend of claim 55 wherein $R^7$ independently is selected from the group consisting of t-butyl groups and phenyl groups.

63. The resin blend of claim 55 wherein $R^7$ is a t-butyl group.

64. The resin blend of claim 48 wherein X, Y, and Z have from about 2 to about 10 carbon atoms.

65. The resin blend of claim 48, wherein X, Y, and Z have from about 2 to about 6 carbon atoms.

66. The resin blend of claim 55 wherein X, Y, and Z have from about 2 to about 6 carbon atoms.

67. The monomer of claim 63 wherein X, Y, and Z have 6 carbon atoms.

68. The resin blend of claim 48 wherein the resin blend has a nematic to isotopic transition temperature of about 50° C., or more.

69. The blend of claim 68 wherein the nematic to isotopic transition temperature is about 60° C., or more.

70. A resin blend comprising:
  an amount of primary liquid crystal monomer having the following general structure:

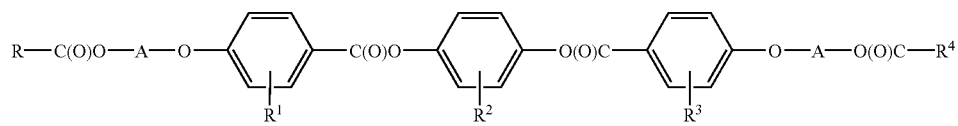

wherein A is selected from the group consisting of branched and linear alkyl groups having from about 2 to about 12 carbon atoms, wherein said branched alkyl groups comprise branches having from about 1 to about 4 carbon atoms; and a quantity of secondary monomer having the following structure:

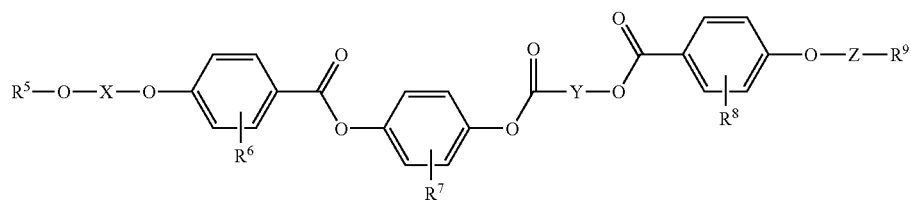

wherein:
- X, Y, and Z independently are selected from the group consisting of linear and branched alkyl groups having from about 2 to about 12 carbon atoms;
- $R^1$, $R^3$, $R^6$, and $R^8$ are selected from the group consisting of hydrogen atoms and methyl groups;
- $R^2$ and $R^7$ independently are selected from the group consisting of t-butyl groups, phenyl groups, isopropyl groups, and secondary butyl groups; and,
- R, $R^4$, $R^5$ and $R^9$ are polymerizable groups selected from the group consisting of nucleophiles and electron deficient alkenes.

71. The resin blend of claim 70 wherein the amount of primary liquid crystal monomer is at a ratio to the quantity of secondary monomer, the ratio and the secondary monomer being adapted to maintain the resin blend in a nematic liquid crystalline state for about 30 minutes or more after addition of inorganic particulate filler at a temperature of 20° C., wherein said resin blend exhibits about 2 vol. % or less polymerization shrinkage.

72. The resin blend of claim 70 wherein the primary liquid crystal monomer is at about a 3:2 ratio to the secondary monomer.

73. The method of claim 70 wherein said polymerizable group is selected from the group consisting of ester groups, organic acid groups, amine groups, hydroxyl groups, and sulfhydryl groups.

74. The method of claim 70 wherein said polymerizable group is an electron deficient alkene independently selected from the group consisting of substituted and unsubstituted alkenyl ester groups comprising a polymerizable unsaturated carbon-carbon bond, wherein said alkenyl group has from about 2 to about 12 carbon atoms.

75. The method of claim 70 wherein said polymerizable group is an electron deficient alkene selected from the group consisting of alkenyl esters, acryloyl groups, methacryloyl groups.

76. The method of claim 70 wherein R, $R^4$, $R^5$ and $R^9$ independently are selected from the group consisting of acryloyl groups and methacryloyl groups.

77. The method of claim 72 wherein R, $R^4$, $R^5$ and $R^9$ independently are selected from the group consisting of acryloyl groups and methacryloyl groups.

78. The resin blend of claim 70 further comprising inorganic particulate filler.

79. The resin blend of claim 70 further comprising inorganic particulate filler.

80. The resin blend of claim 77 further comprising inorganic particulate filler.

81. The resin blend of claim 80 wherein the inorganic particulate filler comprises silicon.

82. The resin blend of claim 70 wherein $R^7$ independently is selected from group consisting of t-butyl groups and phenyl groups.

83. The resin blend of claim 72 wherein $R^7$ independently is selected from the group consisting of t-butyl groups and phenyl groups.

84. The resin blend of claim 77 wherein $R^7$ independently is selected from the group consisting of t-butyl groups and phenyl groups.

85. The resin blend of claim 77 wherein $R^7$ is a t-butyl group.

86. The resin blend of claim 70 wherein X, Y, and Z have from about 2 to about 10 carbon atoms.

87. The resin blend of claim 70 wherein X, Y, and Z have from about 2 to about 6 carbon atoms.

88. The resin blend of claim 77 wherein X, Y, and Z have from about 2 to about 6 carbon atoms.

89. The monomer of claim 85 wherein X, Y, and Z have 6 carbon atoms.

90. The resin blend of claim 70 wherein the resin blend has a nematic to isotopic transition temperature of about 50° C., or more.

91. The blend of claim 70 wherein the nematic to isotopic transition temperature is about 60° C., or more.

* * * * *

UNITED STATES PATENT AND TRADEMARK OFFICE
CERTIFICATE OF CORRECTION

| | |
|---|---|
| PATENT NO. | : 7,094,358 B2 |
| APPLICATION NO. | : 10/093001 |
| DATED | : August 22, 2006 |
| INVENTOR(S) | : Barry K. Norling and Neera Satsangi |

It is certified that error appears in the above-identified patent and that said Letters Patent is hereby corrected as shown below:

Column 24, after line 53, please delete the structure and insert the following structure:

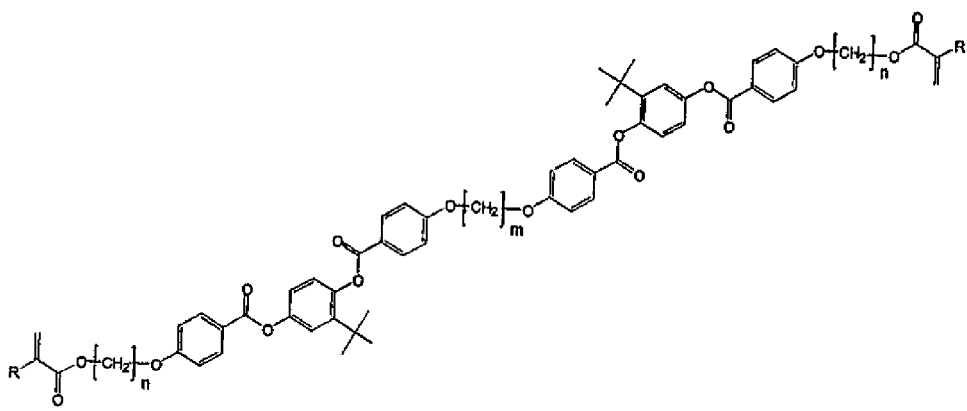

Column 29, beginning of second line in Claim 6, insert -- a -- before "quantity".

Column 31, line 1 in Claim 9, please delete "method" and insert -- resin blend --.

Column 31, line 5 in Claim 10, please delete "method" and insert -- resin blend --.

Column 31, line 11 in Claim 11, please delete "method" and insert -- resin blend --.

Column 31, line 15 in Claim 12, please delete "method" and insert -- resin blend --.

Column 31, line 18 in Claim 13, please delete "method" and insert -- resin blend --.

Column 32, line 19 in Claim 23, please delete "monomer" and insert -- resin blend --.

UNITED STATES PATENT AND TRADEMARK OFFICE
CERTIFICATE OF CORRECTION

| | | |
|---|---|---|
| PATENT NO. | : 7,094,358 B2 | |
| APPLICATION NO. | : 10/093001 | |
| DATED | : August 22, 2006 | |
| INVENTOR(S) | : Barry K. Norling and Neera Satsangi | |

It is certified that error appears in the above-identified patent and that said Letters Patent is hereby corrected as shown below:

Column 33, line 54 in Claim 30, please delete "method" and insert -- resin blend --.

Column 33, line 58 in Claim 31, please delete "method" and insert -- resin blend --.

Column 33, line 64 in Claim 32, please delete "method" and insert -- resin blend --.

Column 34, line 1 in Claim 33, please delete "method" and insert -- resin blend --.

Column 34, line 5 in Claim 34, please delete "method" and insert -- resin blend --.

Column 34, line 57 in Claim 45, please delete "monomer" and insert -- resin blend --.

Column 34, line 62 in Claim 47, please delete "blend" and insert -- resin blend --.

Column 35, line 51 in Claim 51, please delete "method" and insert -- resin blend --.

Column 35, line 55 in Claim 52, please delete "method" and insert -- resin blend --.

Column 35, line 61 in Claim 53, please delete "method" and insert -- resin blend --.

Column 35, line 65 in Claim 54, please delete "method" and insert -- resin blend --.

Column 36, line 28 in Claim 55, please delete "method" and insert -- resin blend --.

Column 36, line 58 in Claim 67, please delete "monomer" and insert -- resin blend --.

Column 36, line 63 in Claim 69, please delete "blend" and insert -- resin blend --.

Column 37, line 52 in Claim 73, please delete "method" and insert -- resin blend --.

Column 37, line 56 in Claim 74, please delete "method" and insert -- resin blend --.

UNITED STATES PATENT AND TRADEMARK OFFICE
CERTIFICATE OF CORRECTION

PATENT NO. : 7,094,358 B2
APPLICATION NO. : 10/093001
DATED : August 22, 2006
INVENTOR(S) : Barry K. Norling and Neera Satsangi It is certified that error appears in the above-identified patent and that said Letters Patent is hereby corrected as shown below:

Column 37, line 62 in Claim 75, please delete "method" and insert -- resin blend --.

Column 37, line 66 in Claim 76, please delete "method" and insert -- resin blend --.

Column 38, line 30 in Claim 77, please delete "method" and insert -- resin blend --.

Column 38, line 59 in Claim 89, please delete "monomer" and insert -- resin blend --.

Column 38, line 64 in Claim 91, please delete "blend" and insert -- resin blend --.

Signed and Sealed this

Sixteenth Day of January, 2007

JON W. DUDAS
*Director of the United States Patent and Trademark Office*